US009959529B1

(12) United States Patent
Varma et al.

(10) Patent No.: US 9,959,529 B1
(45) Date of Patent: May 1, 2018

(54) OPEN TAB TRANSACTIONS

(71) Applicant: Square, Inc., San Francisco, CA (US)

(72) Inventors: Ajit Kalidindi Varma, San Francisco, CA (US); Jesse Reiss, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 648 days.

(21) Appl. No.: 14/498,876

(22) Filed: Sep. 26, 2014

Related U.S. Application Data

(60) Provisional application No. 61/991,584, filed on May 11, 2014.

(51) Int. Cl.
*G06Q 20/10* (2012.01)
*G06Q 20/32* (2012.01)
*G06Q 20/24* (2012.01)
*H04W 4/02* (2018.01)

(52) U.S. Cl.
CPC ........... *G06Q 20/102* (2013.01); *G06Q 20/24* (2013.01); *G06Q 20/3224* (2013.01); *H04W 4/021* (2013.01)

(58) Field of Classification Search
CPC .................................................... G06Q 20/102
USPC ............................................................ 705/40
See application file for complete search history.

(56) References Cited

U.S. PATENT DOCUMENTS

| | | | |
|---|---|---|---|
| 6,026,375 A | 2/2000 | Hall et al. | |
| 6,587,835 B1 | 7/2003 | Treyz et al. | |
| 7,004,382 B2 | 2/2006 | Sandru | |
| 7,024,205 B1 | 4/2006 | Hose | |
| 7,207,480 B1 | 4/2007 | Geddes | |
| 7,376,433 B1 | 5/2008 | Hose | |
| 7,711,100 B2 | 5/2010 | Dennis | |
| 7,792,709 B1 | 9/2010 | Trandal et al. | |
| 7,831,246 B1 | 11/2010 | Smith et al. | |
| 7,831,520 B2 | 11/2010 | Mengerink | |
| 7,848,765 B2 | 12/2010 | Phillips et al. | |
| 8,090,351 B2 | 1/2012 | Klein | |
| 8,126,806 B1 | 2/2012 | DiMartino et al. | |
| 8,135,624 B1 | 3/2012 | Ramalingam et al. | |

(Continued)

FOREIGN PATENT DOCUMENTS

| | | |
|---|---|---|
| CA | 2 777 885 A1 | 5/2013 |
| DE | 20 2012 100 620 U1 | 8/2012 |
| WO | 2015/066056 A1 | 5/2015 |

OTHER PUBLICATIONS

Final Office Action dated Dec. 4, 2015, for U.S. Appl. No. 13/627,602, of Henderson, W., et al., filed Sep. 26, 2012.

(Continued)

*Primary Examiner* — Lindsay M Maguire
(74) *Attorney, Agent, or Firm* — Polsinelli PC

(57) ABSTRACT

A customer device generates an order for purchasing one or more goods or services from a merchant. A list of the purchased items is stored in a data structure designated as a tab. The list is routed to a merchant device. The customer device is carried by a user to the merchant. When the user reaches the merchant, the customer device or merchant device can receive a request to add an additional item to the list of purchased items. The tab remains open and modifiable until the customer device or merchant device receives an input to close it. Payment for the goods or services listed in the modified tab is processed upon closing of the tab.

27 Claims, 25 Drawing Sheets

(56) References Cited

U.S. PATENT DOCUMENTS

| | | |
|---|---|---|
| 8,140,418 B1 | 3/2012 | Casey et al. |
| 8,160,959 B2 | 4/2012 | Rackley, III et al. |
| 8,239,276 B2 | 8/2012 | Lin et al. |
| 8,285,604 B1 | 10/2012 | Trandal et al. |
| 8,369,842 B2 | 2/2013 | Proctor, Jr. et al. |
| 8,396,808 B2 | 3/2013 | Greenspan |
| 8,417,258 B2 | 4/2013 | Barnes, Jr. |
| 8,463,295 B1 | 6/2013 | Caralis et al. |
| 8,485,440 B1 | 7/2013 | Arora et al. |
| 8,510,220 B2 | 8/2013 | Rackley, III et al. |
| 8,554,670 B1 | 10/2013 | Blank et al. |
| 8,635,157 B2 | 1/2014 | Smith et al. |
| 8,655,782 B2 | 2/2014 | Poon et al. |
| 8,659,427 B2 | 2/2014 | Brown et al. |
| 8,972,297 B2 | 3/2015 | Kay et al. |
| 9,373,112 B1 | 6/2016 | Henderson et al. |
| 9,741,045 B1 | 8/2017 | Henderson et al. |
| 2002/0111907 A1 | 8/2002 | Ling |
| 2002/0181710 A1 | 12/2002 | Adam et al. |
| 2002/0194121 A1 | 12/2002 | Takayama |
| 2003/0004842 A1 | 1/2003 | Williams et al. |
| 2003/0061109 A1 | 3/2003 | Banerjee et al. |
| 2004/0093281 A1 | 5/2004 | Silverstein et al. |
| 2005/0271199 A1 | 12/2005 | Collins, Jr. |
| 2006/0093998 A1 | 5/2006 | Vertegaal |
| 2006/0138219 A1 | 6/2006 | Brzezniak et al. |
| 2007/0022375 A1 | 1/2007 | Walker |
| 2007/0072678 A1 | 3/2007 | Dagres |
| 2007/0150375 A1 | 6/2007 | Yang |
| 2007/0203801 A1 | 8/2007 | Istfan |
| 2007/0214237 A1 | 9/2007 | Stibel et al. |
| 2007/0244778 A1 | 10/2007 | Bailard |
| 2008/0080682 A1 | 4/2008 | Ogunwale et al. |
| 2008/0084977 A1 | 4/2008 | Nayak et al. |
| 2008/0142599 A1 | 6/2008 | Benillouche et al. |
| 2008/0172733 A1 | 7/2008 | Coriaty et al. |
| 2008/0207296 A1 | 8/2008 | Lutnick et al. |
| 2008/0319843 A1 | 12/2008 | Moser et al. |
| 2009/0030787 A1 | 1/2009 | Pon et al. |
| 2009/0076896 A1 | 3/2009 | DeWitt et al. |
| 2009/0076925 A1 | 3/2009 | DeWitt et al. |
| 2009/0125429 A1 | 5/2009 | Takayama |
| 2009/0177581 A1 | 7/2009 | Garcia et al. |
| 2009/0187492 A1 | 7/2009 | Hammad et al. |
| 2009/0204492 A1 | 8/2009 | Scifo et al. |
| 2009/0264070 A1 | 10/2009 | Lim |
| 2009/0298514 A1 | 12/2009 | Ullah |
| 2009/0313138 A1 | 12/2009 | Ratnakar |
| 2009/0313165 A1 | 12/2009 | Walter |
| 2010/0010906 A1 | 1/2010 | Grecia |
| 2010/0063889 A1 | 3/2010 | Proctor, Jr. et al. |
| 2010/0070369 A1 | 3/2010 | Fenton et al. |
| 2010/0070378 A1 | 3/2010 | Trotman et al. |
| 2010/0076853 A1 | 3/2010 | Schwarz |
| 2010/0082445 A1 | 4/2010 | Hodge et al. |
| 2010/0082455 A1 | 4/2010 | Rosenblatt et al. |
| 2010/0082487 A1 | 4/2010 | Nelsen |
| 2010/0121726 A1 | 5/2010 | Coulter et al. |
| 2010/0125495 A1 | 5/2010 | Smith et al. |
| 2010/0125510 A1 | 5/2010 | Smith et al. |
| 2010/0174596 A1 | 7/2010 | Gilman et al. |
| 2010/0216396 A1 | 8/2010 | Fernandez et al. |
| 2010/0250410 A1 | 9/2010 | Song et al. |
| 2010/0306080 A1 | 12/2010 | Trandal et al. |
| 2010/0312385 A1 | 12/2010 | Deuber |
| 2011/0016051 A1 | 1/2011 | Trifiletti et al. |
| 2011/0022472 A1 | 1/2011 | Zan |
| 2011/0059784 A1 | 3/2011 | Lutnick et al. |
| 2011/0153440 A1 | 6/2011 | Singhal |
| 2011/0172004 A1* | 7/2011 | Breitenbach ..... G06Q 10/06311 463/25 |
| 2011/0173041 A1* | 7/2011 | Breitenbach ..... G06Q 10/06311 705/7.13 |
| 2011/0184837 A1 | 7/2011 | Biro |
| 2011/0231292 A1 | 9/2011 | McCown |
| 2011/0238476 A1 | 9/2011 | Carr et al. |
| 2011/0238514 A1 | 9/2011 | Ramalingam et al. |
| 2011/0238517 A1 | 9/2011 | Ramalingam et al. |
| 2011/0249668 A1 | 10/2011 | Van Milligan et al. |
| 2011/0251892 A1 | 10/2011 | Laracey |
| 2011/0258058 A1 | 10/2011 | Carroll et al. |
| 2011/0276418 A1 | 11/2011 | Velani |
| 2011/0276419 A1 | 11/2011 | Johnson et al. |
| 2011/0313867 A9 | 12/2011 | Silver |
| 2012/0016731 A1 | 1/2012 | Smith et al. |
| 2012/0072350 A1 | 3/2012 | Goldthwaite et al. |
| 2012/0078673 A1 | 3/2012 | Koke et al. |
| 2012/0078751 A1 | 3/2012 | MacPhail et al. |
| 2012/0089461 A1 | 4/2012 | Greenspan |
| 2012/0089470 A1 | 4/2012 | Barnes, Jr. |
| 2012/0109749 A1 | 5/2012 | Subramanian et al. |
| 2012/0109752 A1 | 5/2012 | Strutton et al. |
| 2012/0130790 A1 | 5/2012 | Lyons et al. |
| 2012/0130794 A1 | 5/2012 | Strieder |
| 2012/0150605 A1 | 6/2012 | Isaacson et al. |
| 2012/0150611 A1 | 6/2012 | Isaacson et al. |
| 2012/0179516 A1 | 7/2012 | Fakhrai et al. |
| 2012/0190386 A1 | 7/2012 | Anderson |
| 2012/0197724 A1 | 8/2012 | Kendall |
| 2012/0197743 A1 | 8/2012 | Grigg et al. |
| 2012/0209657 A1 | 8/2012 | Connolly |
| 2012/0209685 A1 | 8/2012 | Nealer et al. |
| 2012/0221421 A1 | 8/2012 | Hammad |
| 2012/0232994 A1 | 9/2012 | Kim et al. |
| 2012/0252418 A1 | 10/2012 | Kandekar et al. |
| 2012/0271692 A1 | 10/2012 | Huang et al. |
| 2012/0290376 A1 | 11/2012 | Dryer et al. |
| 2012/0290421 A1 | 11/2012 | Qawami et al. |
| 2012/0290422 A1 | 11/2012 | Bhinder |
| 2012/0303425 A1 | 11/2012 | Katzin et al. |
| 2012/0310824 A1 | 12/2012 | Liberty |
| 2012/0330769 A1 | 12/2012 | Arceo |
| 2013/0013499 A1 | 1/2013 | Kalgi |
| 2013/0030913 A1 | 1/2013 | Zhu et al. |
| 2013/0036048 A1 | 2/2013 | Campos et al. |
| 2013/0036051 A1 | 2/2013 | Giordano et al. |
| 2013/0046589 A1 | 2/2013 | Grigg et al. |
| 2013/0054367 A1 | 2/2013 | Grigg et al. |
| 2013/0059598 A1* | 3/2013 | Miyagi ................ H04W 4/023 455/456.1 |
| 2013/0060623 A1 | 3/2013 | Walker et al. |
| 2013/0085860 A1 | 4/2013 | Summers et al. |
| 2013/0103760 A1 | 4/2013 | Golding et al. |
| 2013/0110658 A1 | 5/2013 | Lyman et al. |
| 2013/0117155 A1 | 5/2013 | Glasgo |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0138500 A1 | 5/2013 | Charaniya et al. |
| 2013/0144674 A1 | 6/2013 | Kim et al. |
| 2013/0144702 A1 | 6/2013 | Tabor et al. |
| 2013/0151380 A1 | 6/2013 | Holt |
| 2013/0151419 A1 | 6/2013 | Hitchcock et al. |
| 2013/0159086 A1 | 6/2013 | Richard |
| 2013/0159119 A1 | 6/2013 | Henderson et al. |
| 2013/0191195 A1 | 7/2013 | Carlson et al. |
| 2013/0191199 A1 | 7/2013 | Corner |
| 2013/0198076 A1 | 8/2013 | Zambelli Hosmer et al. |
| 2013/0218683 A1 | 8/2013 | Hannan |
| 2013/0246207 A1 | 9/2013 | Novak et al. |
| 2013/0246301 A1 | 9/2013 | Radhakrishnan et al. |
| 2013/0248596 A1 | 9/2013 | Arora et al. |
| 2013/0282490 A1 | 10/2013 | Kramer et al. |
| 2014/0012689 A1 | 1/2014 | Henderson et al. |
| 2014/0012757 A1 | 1/2014 | Henderson et al. |
| 2014/0074743 A1 | 3/2014 | Rademaker |
| 2014/0108173 A1 | 4/2014 | Cooper et al. |
| 2014/0108177 A1 | 4/2014 | Erke et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0156531 A1 | 6/2014 | Poon et al. |
| 2014/0263630 A1 | 9/2014 | Richardson et al. |

(56) References Cited

U.S. PATENT DOCUMENTS

| | | |
|---|---|---|
| 2014/0278609 A1 | 9/2014 | Capps |
| 2014/0310182 A1 | 10/2014 | Cummins |
| 2014/0359510 A1 | 12/2014 | Graf et al. |
| 2014/0379582 A1 | 12/2014 | Caglayan et al. |
| 2015/0031393 A1 | 1/2015 | Post et al. |
| 2015/0046339 A1 | 2/2015 | Wong et al. |
| 2015/0081532 A1* | 3/2015 | Lewis ............... G06Q 30/0261 705/39 |
| 2015/0120509 A1 | 4/2015 | Moring et al. |
| 2015/0339648 A1 | 11/2015 | Kushevsky et al. |
| 2016/0210606 A1 | 7/2016 | Henderson et al. |
| 2017/0124567 A1 | 5/2017 | Henderson et al. |

OTHER PUBLICATIONS

Final Office Action dated Feb. 12, 2016, for U.S. Appl. No. 14/017,940, of Henderson, W., et al., filed Sep. 4, 2013.
Final Office Action dated Oct. 31, 2016, for U.S. Appl. No. 14/498,975, of Varma, A.K., et al., filed Sep. 26, 2014.
Final Office Action dated Nov. 3, 2016, for U.S. Appl. No. 13/683,841, of Henderson, W., et al., filed Nov. 21, 2012.
Notice of Allowance dated Nov. 30, 2016, for U.S. Appl. No. 14/017,940, of Henderson, W., et al., filed Sep. 4, 2013.
Notice of Allowance dated Dec. 27, 2016, for U.S. Appl. No. 14/017,247, of Henderson, W., et al., filed Sep. 3, 2013.
Advisory Action dated Feb. 23, 2017, for U.S. Appl. No. 13/683,841, of Henderson, W., et al., filed Nov. 21, 2012.
Non-Final Office Action dated Feb. 23, 2017, for U.S. Appl. No. 14/311,176, of Moring, M.D., et al., filed Jun. 20, 2014.
Examiner's Requisition for Canadian Patent Application No. 2,777,885, dated Apr. 5, 2017.
Notice of Allowance dated Apr. 12, 2017, for U.S. Appl. No. 13/627,602, of Henderson, W., et al., filed Sep. 26, 2012.
Non-Final Office Action dated May 1, 2017, for U.S. Appl. No. 14/498,922, of Varma, A.K., et al., filed Sep. 26, 2014.
Non-Final Office Action dated May 4, 2017, for U.S. Patent Application No. 15/084,390, of Henderson, W., et al., filed Mar. 29, 2016.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Justin, "Visa Enters the Location-Based Mobile Marketing Space With New iPhone App," dated Dec. 14, 2010, Retrieved from the internet URL: http://www.mobilemarketingwatch.com/visa-enters-the-location-based-mobile-marketing-space-with-new-iphone-app-11875/, on Feb. 23, 2015, p. 1.
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.
Non-Final Office Action dated Aug. 23, 2013, for U.S. Appl. No. 13/627,615, of Henderson, W., et al., filed Sep. 26, 2012.
Non-Final Office Action dated Oct. 25, 2013, for U.S. Appl. No. 13/683,841, of Henderson, W., et al., filed Nov. 21, 2012.
Final Office Action dated Dec. 23, 2013, for U.S. Appl. No. 13/627,615, of Henderson, W., et al., filed Sep. 26, 2012.
Non-Final Office Action dated May 29, 2014, for U.S. Appl. No. 14/017,247, of Henderson, W., et al., filed Sep. 3, 2013.
Non-Final Office Action dated Sep. 23, 2014, for U.S. Appl. No. 13/627,615, of Henderson, W., et al., filed Sep. 26, 2012.
Final Office Action dated Dec. 18, 2014, for U.S. Appl. No. 13/627,615, of Henderson, W., et al., filed Sep. 26, 2012.
Non-Final Office Action dated Jan. 7, 2015, for U.S. Appl. No. 14/017,940, of Henderson, W., et al., filed Sep. 4, 2013.
Non-Final Office Action mailed Jan. 9, 2015, for U.S. Appl. No. 14/498,975, of Varma, A., K., et al., filed Sep. 26, 2014.
Non-Final Office Action dated Mar. 17, 2015, for U.S. Appl. No. 13/683,879, of Henderson, W., et al., filed Nov. 21, 2012.
Advisory Action dated May 4, 2015, for U.S. Appl. No. 13/627,615, of Henderson, W., et al., filed Sep. 26, 2012.
Non-Final Office Action dated May 29, 2015, for U.S. Appl. No. 13/627,602, of Henderson, W., et al., filed Sep. 26, 2012.
Final Office Action dated Jul. 8, 2015, for U.S. Appl. No. 14/498,975, of Varma, A., K., et al., filed Sep. 26, 2014.
Non-Final Office Action dated Aug. 12, 2015, for U.S. Appl. No. 13/627,615, of Henderson, W., et al., filed Sep. 26, 2012.
Non-Final Office Action dated Aug. 26, 2015, for U.S. Appl. No. 14/017,247, of Henderson, W. et al., filed Sep. 3, 2013.
Non-Final Office Action dated Aug. 27, 2015, for U.S. Appl. No. 14/017,940, of Henderson, W., et al., filed Sep. 4, 2013.
International Search Report and Written Opinion for International Application No. PCT/US2014/062697, dated Feb. 10, 2015.
Notice of Allowance dated Mar. 1, 2016, for U.S. Appl. No. 13/627,615, of Henderson, W., et al., filed Sep. 26, 2012.
Non-Final Office Action dated Apr. 22, 2016, for U.S. Appl. No. 13/683,879, of Henderson, W., et al., filed Nov. 21, 2012.
Non-Final Office Action dated Apr. 22, 2016, for U.S. Appl. No. 13/683,841, of Henderson, W., et al., filed Nov. 21, 2012.
Non-Final Office Action dated Apr. 22, 2016, for U.S. Appl. No. 14/498,975, of Varma, A.K., et al., filed Sep. 26, 2014.
Final Office Action dated Apr. 27, 2016, for U.S. Appl. No. 14/017,247, of Henderson, W., et al., filed Sep. 3, 2013.
Advisory Action dated Aug. 5, 2016, for U.S. Appl. No. 14/017,247, of Henderson, W., et al., filed Sep. 3, 2013.
Non-Final Office Action dated Aug. 29, 2016, for U.S. Appl. No. 13/627,602, of Henderson, W., et al., filed Sep. 26, 2012.
Notice of Allowance dated Oct. 7, 2016, for U.S. Appl. No. 14/017,940, of Henderson, W., et al., filed Sep. 4, 2013.
Notice of Allowance dated Oct. 24, 2016, for U.S. Appl. No. 13/683,879, of Henderson, W., et al., filed Nov. 21, 2012.
Final Office Action dated Nov. 5, 2015, for U.S. Appl. No. 13/683,879, of Henderson, W., et al., filed Nov. 21, 2012.
*Uber*. Google Play. Published on Nov. 10, 2014. Retrieved from the internet on Nov. 12, 2014. Retrieved from the internet: URL<https://play.google.com/store/apps/details?id=com.ubercab&hl=en>. 2 pages.
Final Office Action dated Aug. 10, 2017, for U.S. Appl. No. 14/311,176, of Moring, D., et al., filed Jun. 20, 2014.
Non-Final Office Action dated Aug. 11, 2017, for U.S. Appl. No. 13/683,841, of Henderson, W., et al., filed Nov. 21, 2012.
Final Office Action dated Aug. 16, 2017, for U.S. Appl. No. 14/498,922, of Varma, A. K., et al., filed Sep. 26, 2014.
Notice of Allowance dated Jun. 20, 2017, for U.S. Appl. No. 14/498,975, of Varma, A.K., et al., filed Sep. 26, 2014.
Non-Final Office Action dated Jul. 13, 2017, for U.S. Appl. No. 14/498,912, of Varma, A.K., et al., filed Sep. 26, 2014.

* cited by examiner

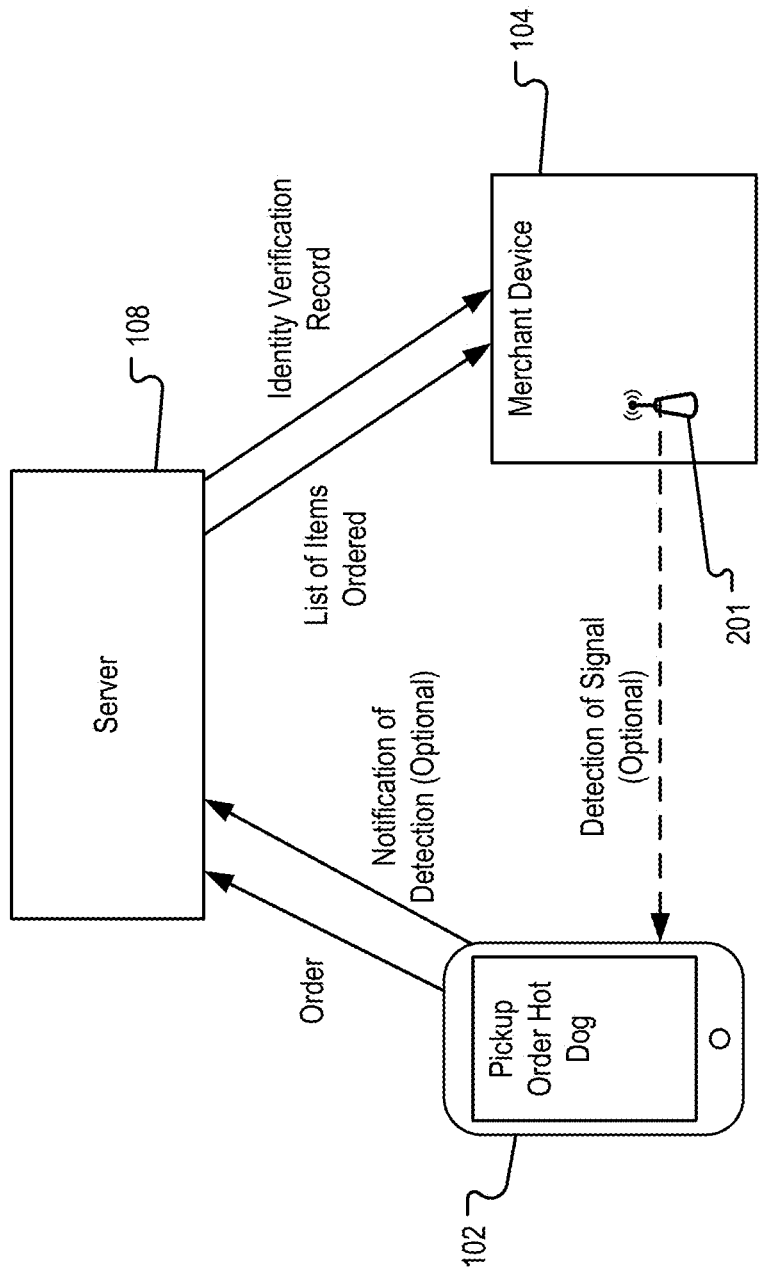

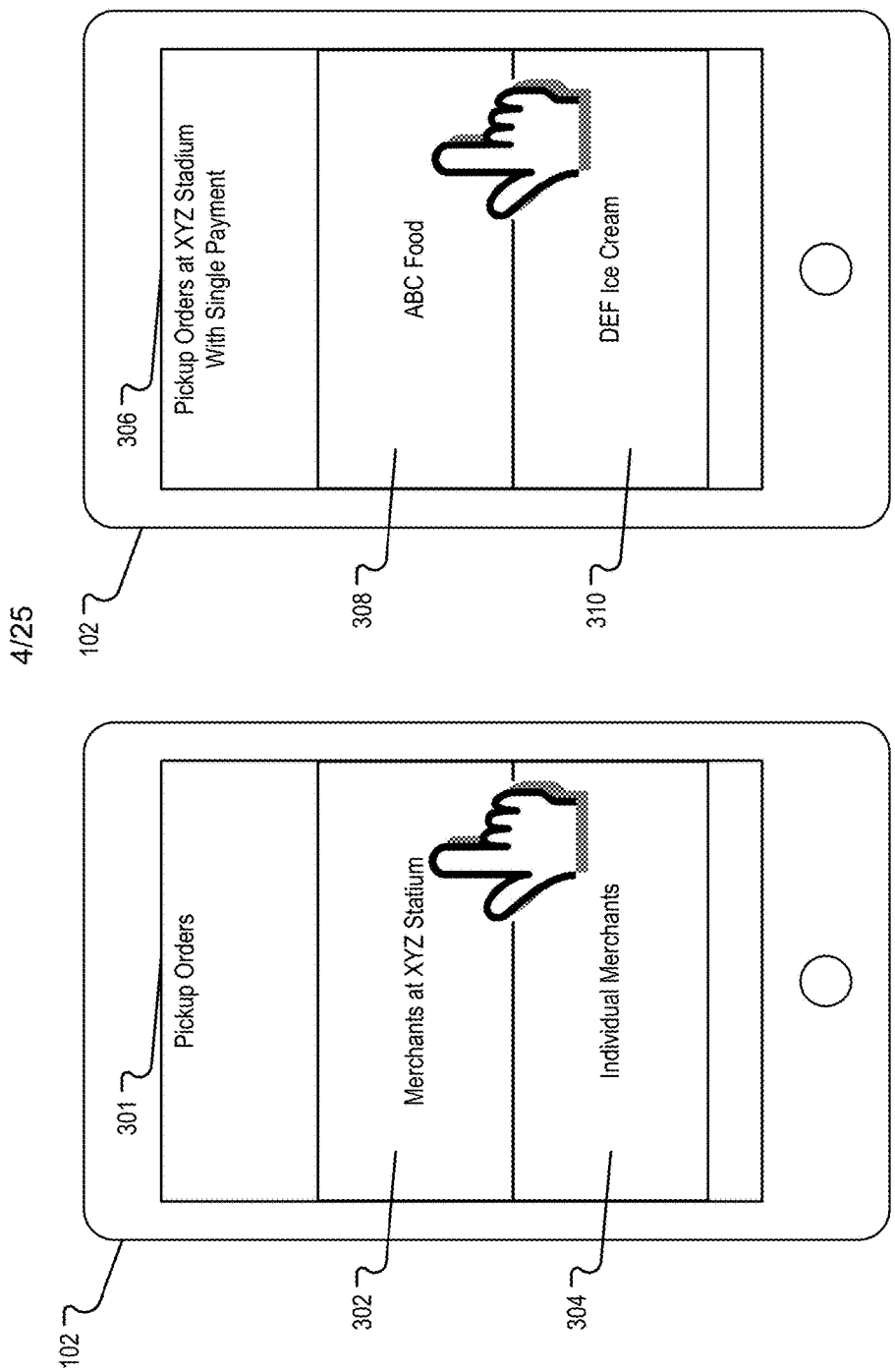

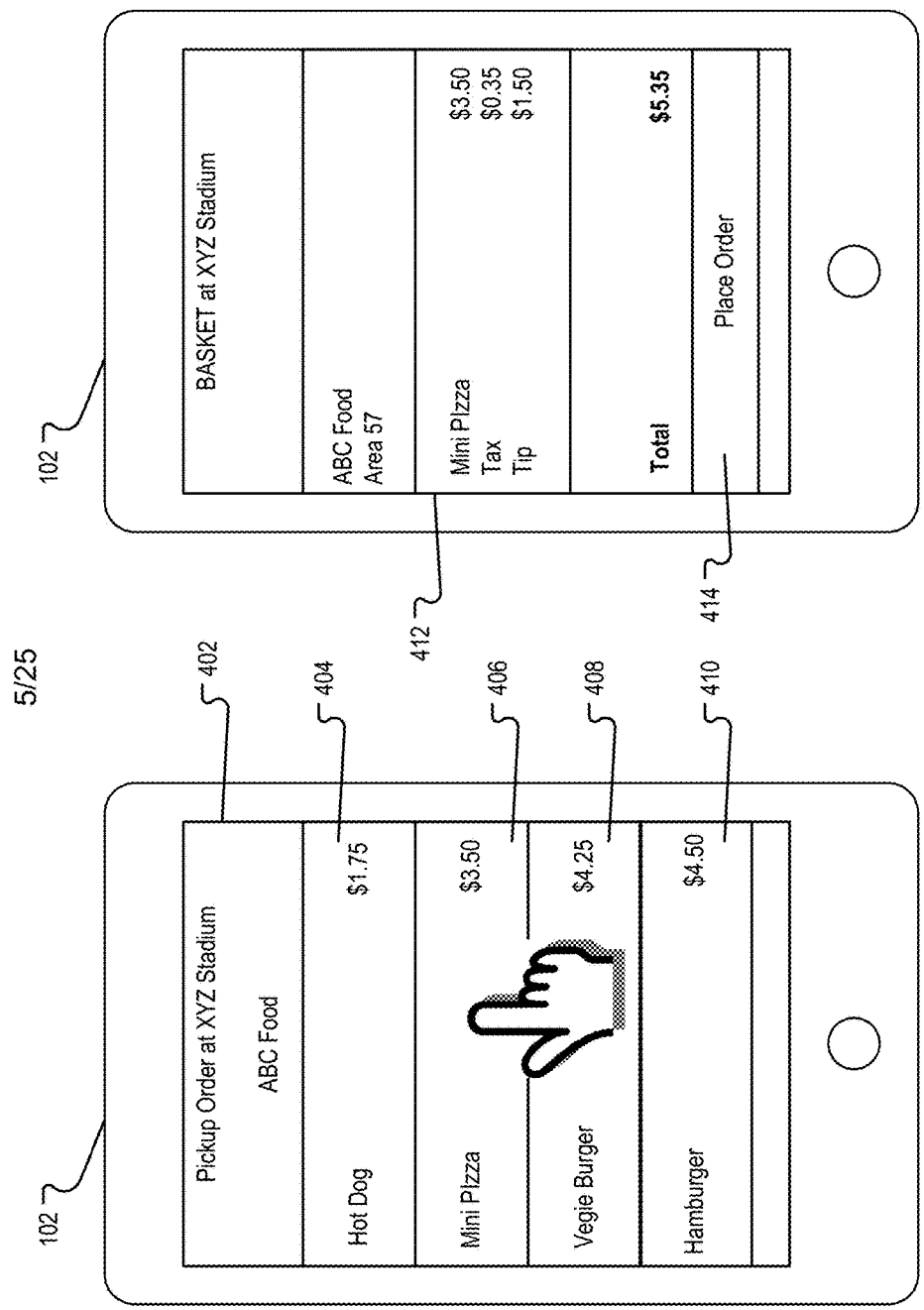

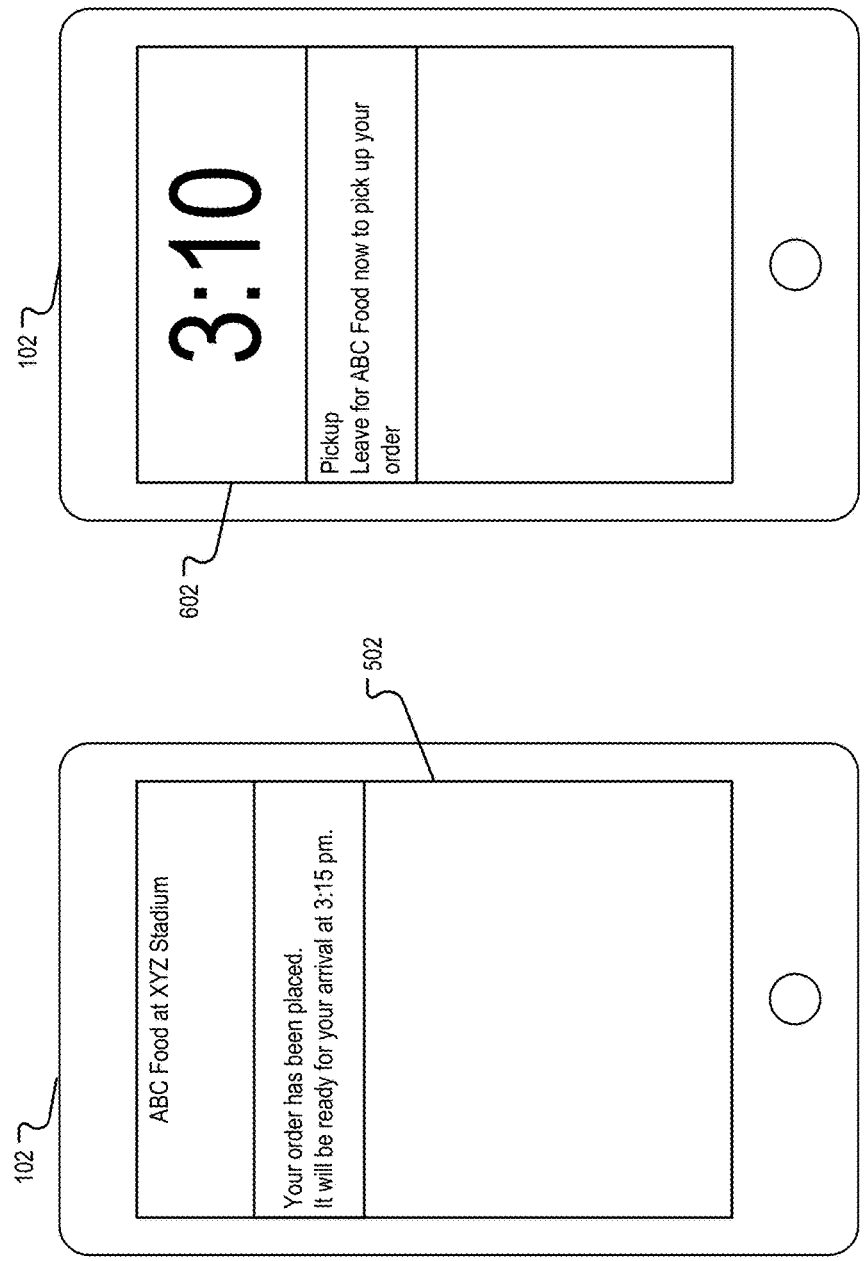

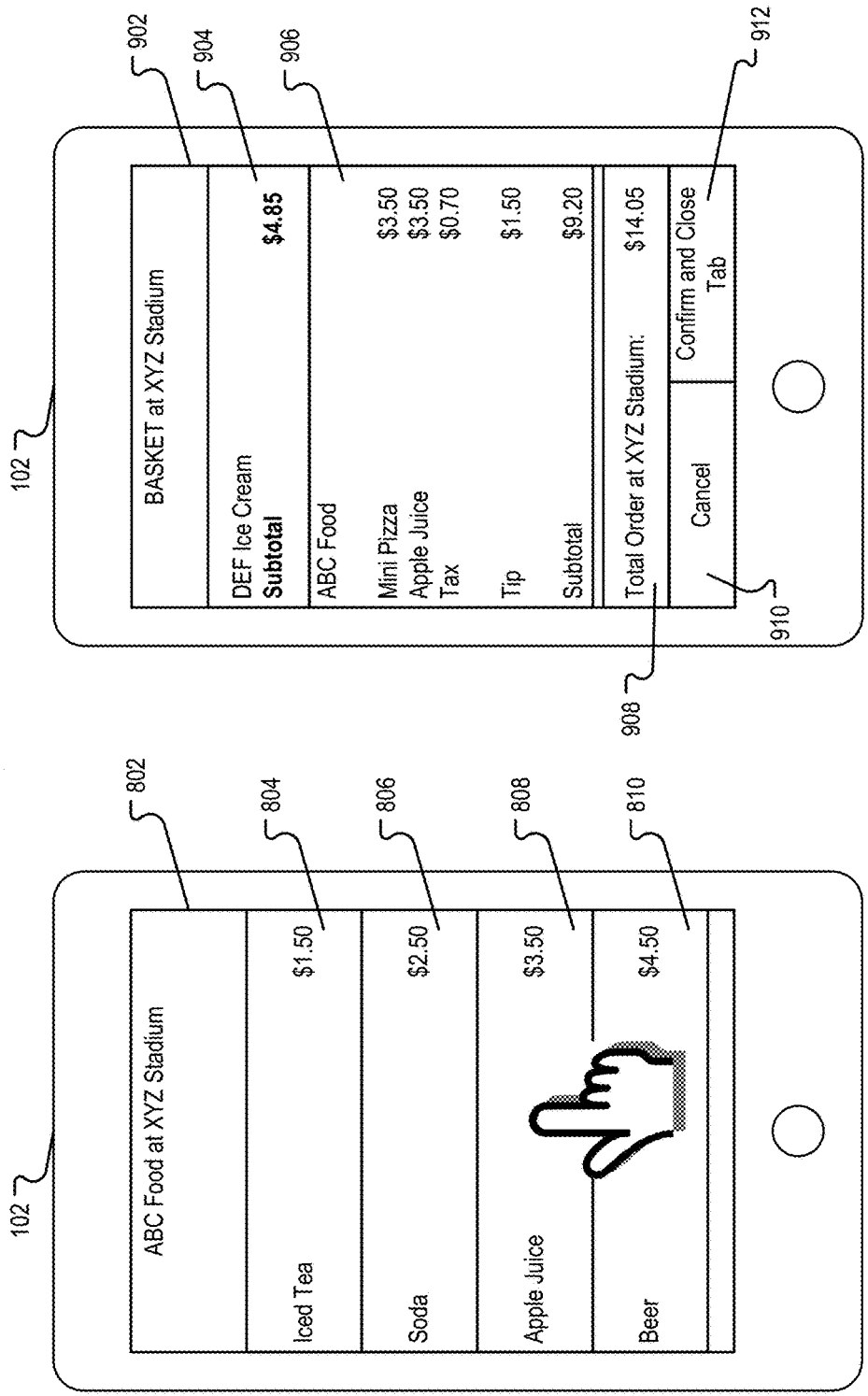

OPEN TAB TRANSACTIONS

CROSS REFERENCE TO RELATED APPLICATIONS

This application is a non-provisional of and claims priority to U.S. Provisional Patent Application No. 61/991,584, filed on May 11, 2014, the entire contents of which are hereby incorporated by reference.

BACKGROUND

This disclosure relates to electronic payment processing.

A conventional point-of-sale credit card transaction can include an authorization stage and a capture stage. In the authorization stage, a user swipes a physical credit card with a magnetic stripe through a merchant device that includes a magnetic card reader. The magnetic card reader electronically sends a payment request to a credit card processor. The credit card processor routes the payment request to a card network, e.g., Visa™ or MasterCard™ network, which in turn routes the payment request to the card issuer, e.g., a bank. If the card issuer approves the transaction, the approval is routed back to the merchant device. In the capture stage, the approved transaction is again routed from the merchant device to the credit card processor, card network and card issuer, and the payment request can include the cardholder's signature. The capture stage can trigger the financial transaction between the card issuer and the merchant device, and creates a receipt. There can also be other entities, e.g., the card acquirer, in the route of the transaction. Various other card transactions, e.g., debit card transactions, may have different routing schemes.

BRIEF DESCRIPTION OF THE DRAWINGS

FIG. 2A is a diagram illustrating an example use case for preordering goods or services from a merchant.

FIGS. 3A and 3B illustrate example user interfaces for initiating an open tab transaction.

FIGS. 4A and 4B illustrate example user interfaces for placing a first order in an open tab transaction.

FIG. 5 illustrates an example user interface for displaying an estimated ready time.

FIG. 6 illustrates an example user interface for providing an alert.

FIG. 8 illustrates an example user interface for placing a third order in an open tab transaction.

FIG. 9 illustrates an example user interface for closing an open tab.

Like reference numbers and designations in the various drawings indicate like elements.

DETAILED DESCRIPTION

Figure 1:
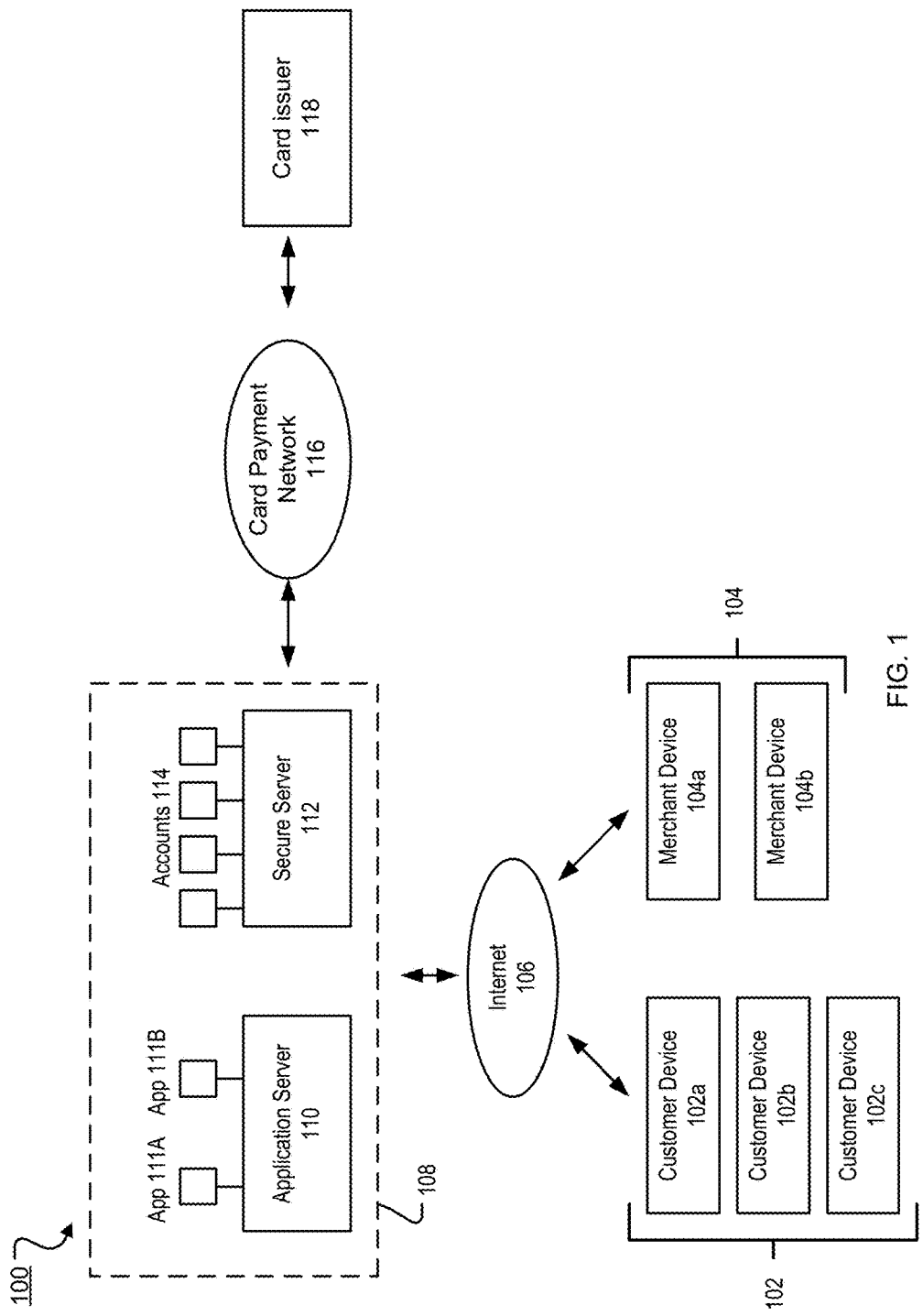
FIG. 1 is a schematic illustration of an example open tab payment system architecture.

A customer device, e.g., a smart phone, can generate an order for purchasing one or more goods or services from a merchant. A list of the items can be stored in a data structure designated as a tab. The list is routed to a merchant device, e.g., a tablet computer. The customer device can be carried by a user to the merchant. When the user reaches the merchant, the customer device or merchant device can receive a request to add an additional goods or services to the list. The tab remains open and modifiable until the customer device or merchant device receives an input to close it. Payment for the goods or services listed in the modified tab is processed upon closing of the tab.

A customer device can create a tab in an open tab transaction. The tab includes a list of one or more goods or services to purchase. In various stages of the transaction, a merchant device may modify the tab. For example, a user may order goods or services from a merchant for pickup at a venue of the merchant. When the user reaches the venue, the user may wish to add a new item to the list. The merchant device can modify the tab by adding the new item. The merchant can push the modified tab to the customer device. The customer device can then display a user interface of the modified tab for the user to approve payment.

A customer device can create a tab including a list of one or more goods or services to purchase. The customer device can associate the tab with a venue where multiple kiosks of a merchant or multiple merchants are located. The customer device can be carried to a first kiosk, or first merchant, to purchase a first item, and then to a second kiosk, or second merchant, to purchase a second item. The tab can remain open for as long as the customer device is located within the venue. The open tab allows a user to purchase multiple items at various locations and pay for all the items purchased in a single payment. The customer device can close the tab upon receiving a user request or upon detecting that the customer device leaves the venue.

A customer device receives an input from a customer selecting one or more items to purchase from a merchant. A list of the selected items can be routed, directly or through a server, to a merchant device of the merchant. The server can provide an identity verification record of the customer to the merchant device. The customer can arrive at the merchant device and request to pick up the selected items. The merchant device, upon receiving an input from the merchant indicating that the customer is authenticated using the identity verification record, approves the purchase and submits price of the selected items to the server for processing.

A merchant device displays a list of identity verification records. Each identity verification record corresponds to a customer who selected one or more items to purchase from a merchant operating the merchant device. The list can be ordered according to priority determined by respective time each customer submitted a respective selection. A notification that a customer arrives at the merchant device can cause a low priority verification record to be displayed high in the list.

A merchant device displays a name of a customer and an image of the customer who submitted a selection of items to purchase from a merchant operating the merchant device. The merchant device can obtain the name and image from a server before or after the merchant device received a list of the selected items. The merchant device can display the name and image. Display of the name and image may or may not be triggered by a notification that the customer device is at the merchant device. The merchant device receives an input from the merchant indicating that a customer who claims the name matches the image. The merchant device approves purchase of the selected items by the customer. The merchant device then submits a total price of the selected items to a server for processing.

The features described in this specification can be implemented in a method that includes operations of, in response to detecting a presence of a customer device at a merchant device, opening a tab on the merchant device, the tab being a data structure that specifies a transaction between a user carrying the customer device and a merchant operating the merchant device, the tab including a list of one or more pre-ordered items for which the merchant device has received an order from the user carrying the customer device prior to detecting the presence of the customer device at the merchant device, wherein opening the tab comprises providing for display a user interface of the tab on the merchant device; receiving, in the merchant device, a request to modify the list, including at least one of a request to add a new item to the list or a request to remove a pre-ordered item from the list; in response to the request, modifying the tab at the merchant device, including at least one of adding the new item or removing the pre-ordered item; adjusting, by the merchant device, a total price of the items purchased as resulted from the adding or removing; and closing the tab upon receiving a request from the user or from the merchant, or upon detecting a departure of the customer device from the merchant device, wherein closing the tab includes closing the user interface and submitting the adjusted total price by the merchant device to a server for processing.

In some implementations, detecting the presence of the customer device at the merchant device can include receiving, by a server, a notification from the customer device indicating that the customer device has entered a geofence associated with the merchant device; and notifying the merchant device of the presence of the customer device at the merchant device. The geofence can be defined by one or more wireless access points or wireless beacons, including, for example, Bluetooth Low Energy (BLE) beacons. A user may carry a proxy card including a BLE circuit that detects, or be detected by, a merchant device that includes a BLE circuit.

The features described in this specification can be implemented in a method that includes operations of receiving, by a server and from a customer device of a user or another device of the user, a request to purchase a first item from a merchant; creating a tab by the server, the tab including a data structure storing information on purchase transactions between the user and the merchant, the information including a first record of purchasing the first item; receiving, by the server, an alert of a tab updating event from the merchant device indicating that, at a time when the customer device is located in proximity with the merchant device, a second item is purchased by the user from the merchant, the proximity approving payment of the first item and the second item; in response to the tab updating event, obtaining, by the server, an updated tab, the updated tab including the first record and a second record of purchasing the second item; and submitting, by the server, at least a portion of an aggregation of the first record and the second record to a financial service for authorization.

In some implementations, the operations can include receiving, by the server and from the merchant device or from the customer device, a notification that the customer device is located in proximity with the merchant device; and in response, providing the first record by the server and to the merchant device for display at the merchant device and for update at the merchant device. The operation may include, upon creating the tab, providing the first record by the server and to the merchant device for display at the merchant device, the display to be triggered by a notification that the customer device is located in proximity with the merchant device. The operations may include receiving, by the server and from the merchant device, an estimated time of readiness of the first item; and providing the estimated time of readiness to the customer device or the user device.

In some implementations, creating the tab can include determining an estimated time of arrival of the user at the merchant device using a distance between a location of the customer device and a location of the merchant device; and providing the estimated time of arrival to the merchant device. The tab updating event can include an input, received at the merchant device, of selecting at least one of an identifier of the second item or a price of the second item to be included in the second record.

In some implementations, obtaining the updated tab can include adding, by the server, the second record to the tab; or receiving, by the server and from the merchant device, the updated tab, wherein the second record is added to the tab by the merchant device. The first record can include a price of the first item, the second record can includes a price of the second item, and the aggregation of the first record and the second record can include a sum of the price of the first item and the price of the second item. Submitting at least a portion of the aggregation to the financial service comprises providing the sum to the financial service. The operations can include providing, by the server, a unified bill to the customer device, the unified bill including a list of the first item and the second item and the sum of the price of the first item and the price of the second item.

The features described in this specification can be implemented to achieve one or more advantages. For example, compared to transactions conducted using a conventional digital wallet application, open tab transactions can provide more flexibility to a buyer. A list of pre-ordered items can be modified on the fly, when the buyer changes his mind. The open tab transactions can reduce the amount of navigation the buyer needs to go through to purchase items, by allowing a single payment for multiple purchases. The open tab transactions can benefit a merchant, too, by allowing the merchant to add items to or delete items from a list of pre-ordered items.

The details of one or more implementations of open tab transactions are set forth in the accompanying drawings and the description below. Other features, aspects, and advantages of the techniques will become apparent from the description, the drawings, and the claims.

FIG. 1 is a schematic illustration of the architecture of an example open tab payment system 100. The open tab payment system 100 can include multiple customer devices 102a, 102b, and 102c, and a merchant device 104. Each of the customer devices 102a 102b, and 102c, as well as one or more merchant devices 104, is connected to a network 106, e.g., the Internet. In general, there is one customer device per customer who will join in a payment transaction. Although FIG. 1 illustrates three customer devices 102a, 102b, 102c, there could be one customer device, two customer devices, or four or more customer devices. Each of customer devices 102a, 102b, and 102c can be a mobile computing device, e.g., a smartphone, a tablet computer, or a wearable computing device. Each of customer devices 102a, 102b, and 102c is configured to execute a customer application, e.g., a digital wallet application program.

Each merchant device 104, e.g., a first merchant device 104a or a second merchant device 104b, is a computing device configured to execute a merchant application, e.g., a cashier application program. Each merchant device 104 can be a mobile device, a tablet computer, a desktop computer, a laptop computer, a dedicated point of sale system, or other data processing apparatus. Each merchant device 104 can include, or be coupled with, a tablet or desktop computer. The merchant device 104a and merchant device 104b may be operated by a same merchant at a same location or at different locations, e.g., different kiosks of the merchant. The merchant device 104a and merchant device 104b may be operated by different merchants.

A payment processor operates a payment service system 108. The customer and merchant devices can communicate with the payment service system 108 using the network 106. The payment service system 108 includes an application server 110 and a secure server 112 to process transactions between each of the customer devices 102a, 102b, and 102c and each merchant device 104. In general, the application server 110 handles non-secure information. For example, the application server 110 can store public merchant information such as the merchant's address or phone number. The application server 110 can also be responsible for transferring a customer application e.g., an open tab digital wallet application 111A, to, or updating the customer application on, each of the customer devices 102a, 102b, and 102c. Likewise, application server 110 can be responsible for transferring the merchant application, e.g., an open tab merchant application 111B, to, or updating the merchant application on, a merchant device 104. In particular, the application server 110 can be responsible for sending information about merchants that have accounts with the payment system to each customer device 102. The secure server 112 handles secure information such as credit card numbers, debit card numbers, bank accounts, customer accounts, customer identifying information or other sensitive information.

The payment service system 108 can communicate electronically with a card payment network 116, e.g., a network for processing a payment card such as Visa, MasterCard, or the like. The payment service system 108 can communicate with a computer system 116 of a card payment network, e.g., Visa or MasterCard. The payment service system 108 can communicate with a computer system of the card payment network 116 over the network 106 or over a different network. The computer systems of the card payment network 116 can communicate in turn with a computer system 118 of a card issuer, e.g., a bank. There can also be computer systems of other entities, e.g., the card acquirer, between the payment service system 108 and the card issuer.

Before a transaction between each customer and the merchant can be performed using the cardless payment system, each customer creates a customer account with the payment service system 108 and the merchant creates a merchant account with the payment service system 108.

A customer, e.g., a user of a customer device 102a, 102b, or 102c, can sign up using a mobile application or using an online website. Prior to the transaction, a customer application is downloaded to the customer device 102a, 102b, or 102c. The download can be facilitated through an application store. The customer application can cause the customer device 102a, 102b, or 102c to perform actions of an open tab transaction. Creation of the customer account can be handled through the customer application, or through another application, e.g., a generic web browser. The customer enters a name, account password, and contact information, e.g., email address. Before a transaction can be performed, the customer also enters financial account information sufficient to conduct the transaction into the payment service system 108. For example, in the case of a credit card account, the customer can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the customer before a transaction can be performed. The photo of the customer would be provided to the merchant so that the merchant can compare the photo to the person. In addition, the payment service system 108 can require a personal identification number (PIN) be entered by the customer. Other requirements can also be added to increase security. The data associated with an account 114, e.g., a customer account, can be stored at the secure server 112, e.g., in a database.

If the customer is signing up with a mobile application, the customer's financial account information can be entered by swiping the financial transaction card through a slot of a card reader coupled to the mobile device. Alternatively, the customer can enter in financial account information by typing in information at the customer device 102, selecting a card from an application on the mobile device, from an online entity, or others. In some implementations, another external application generates a receipt that is sent to the customer. The receipt then includes a hypertext link that allows a customer to easily create a customer account in the cardless payment system. For example, activating the link in the receipt can automatically create a customer account with a payment card prefilled with the card used in the receipt to reduce effort by the customer. In effect, activating a new account using a receipt auto-verifies the customer into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with an account 114, e.g., a merchant account, can be stored at the secure server 112, e.g., in a database.

At some point prior to the transaction, a merchant application is downloaded to the merchant device 104, e.g., through an application store. Creation of the merchant account can be handled through the merchant application, or through another application, e.g., a generic web browser. The merchant application can include functions for modifying an open tab.

Eventually, in order to receive funds from the transaction, the merchant will need to enter financial account information into the payment service system sufficient to receive funds. For example, in the case of a bank account, the customer can enter the bank account number and routing number. However, the merchant's financial account can also be associated with a credit card account or another third party financial account. In addition, in some implementations, if the merchant has not entered the financial account information, the payment processor can hold the received funds until the financial account information is provided.

FIG. 2A is a diagram illustrating an example use case for preordering goods or services from a merchant. A customer device 102 receives a customer input to order goods or services. The customer device 102 can be any of the customer device 102a, 102b, or 102c of FIG. 1. For example, the server system 108 can operate a storefront for the merchant. Using the customer device, e.g., a web browser or a dedicated application, the customer can browse the storefront, and select items offered by the merchant. Once the customer has selected the goods or services, identification of the selected items is sent to the server. The server, in turn, sends the identification of the selected items to the merchant device 104. The server also sends an identification verification record including personal identifying information, e.g., a name of the customer, and identity verification information, e.g., an image of the customer, a password or personal identification number, to the merchant device. Receipt of the identification verification record and selected items triggers the merchant device 104 to display the name, e.g., in a list of names of customers that have placed orders.

The list of names can be ordered by the time of receipt of the order, or by an estimated time of arrival.

When the customer arrives at the merchant device, the customer can provide the personal identifying information. The merchant finds the personal identifying information, e.g., finds the customer's name in the list. Then the merchant can use the identity verification information to confirm the identity of the customer, e.g., by comparing the image to the customer in person, or by having the customer say the password or personal identification number.

At this point, the customer can approve the transaction, and in response to an input into the merchant device 104, the merchant device 104 can submit the transaction to the server 108 for authorization. Since the customer's credit card number is held by the server 108, the customer does not need to present a payment card, and the merchant device does not need to receive the payment card number.

In some implementations, the customer name and identification of the selected items is sent by the server 108 to the merchant device 104 automatically once the information is received by the server 108. That is, the name and identification of the selected items can be sent regardless of the location of the customer device 102. The customer need not carry the customer device 102 to the merchant device 104.

In some implementations, the customer name and identification of the selected items is sent by the server 108 to the merchant device 104 once the server 108 receives an indication from the customer device 102 that the customer device 102 is within a proximity to the merchant device 104. For example, the customer device 102 can detect a beacon at the merchant device 104 or determine that the customer device is within a geofence surrounding the merchant device 104. In some implementations, the customer name and identification of the selected items is sent by the server 108 to the merchant device 104 automatically. The user carries the customer device 102 to the merchant device 104. The customer device 102 detects that the customer device 102 enters a geofence, e.g., by detecting a wireless signal from a signal source 201 associated with the merchant device 104. The signal source 201 can be a wireless access point or a Bluetooth Low Energy (BLE) beacon. The signal source 201 can be a part of the merchant device 104, or be associated with the merchant device 104 through registration in a merchant device database in server 108. The customer device 102 notifies the server 108 of the detection. The server 108 sends to the merchant device 104 an indication that the customer device 102 is within a proximity to the merchant device 104. This can trigger the merchant device 104 to reorder the listing of names on the display so that customer name is placed at higher priority in the list.

Figure 2B:
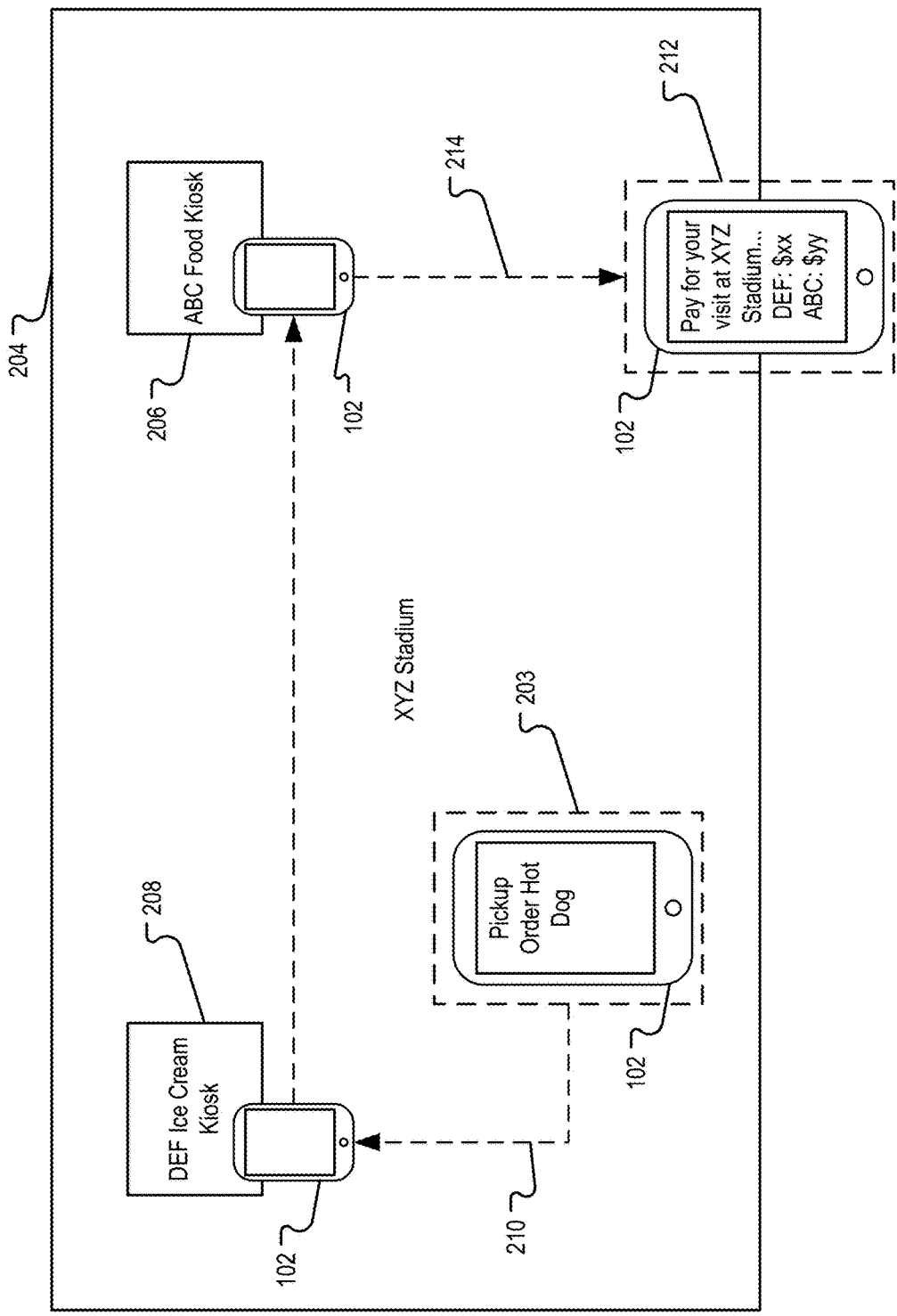
FIG. 2B is a diagram illustrating an example use case of an open tab transaction at multiple locations.

FIG. 2B is a diagram illustrating an example use case of an open tab transaction at multiple locations. A customer device 102 receives a customer input to order goods or services. The customer device 102 can be any of the customer device 102a, 102b, or 102c of FIG. 1. In response to the user input, the customer device 102 creates, or causes a server to create, a tab. The tab, or ticket, is a data structure storing information relating the customer device and a merchant. The information can include a list of goods or services that the user ordered from the merchant, a price for each item, and a total price. The tab can be stored on the customer device 102, on a merchant device, or on the server. The server can be the payment service system 108 of FIG. 1.

Creating the tab includes location-based operations. The customer device 102 can determine a geographic location 203 of the customer device 102. Using a geocode database storing records of geographic features and their locations, the customer device 102 can determine that the geographic location 203 is in a geofence of a venue 204. The venue 204 can be a building, e.g., a stadium, a shopping mall, or an airport, or a geographic area, e.g., a resort, an amusement park, or a fairground. The geocode database can be stored on the customer device 102 or on a server located remotely from the customer device 102.

The geofence can be associated with function of triggering the customer device 102 to designate the tab as an open tab by associating the tab with the venue 204 "XYZ Stadium." After designating the tab as the open tab, the customer device 102 can record orders or purchases by the customer device 102 at multiple places in the venue 204 in aggregation, and allow the customer to pay the aggregated off-site orders and on-site purchases in a single payment action. Off-site orders, also referred to as pre-orders, pickup orders, or simply orders, include purchases made at a location remote from a merchant, e.g., in an online transaction. On-site purchases, simply referred to as purchases, include purchases made at the merchant, e.g., in a store. The customer device 102 can associate the tab with the venue 204 automatically upon determining, from a merchant database, that multiple merchant devices are located in venue 204. Alternatively or additionally, the customer device 102 can associate the tab with the venue 204 upon providing a user option and receiving a user input for associating the tab with the venue 204.

The customer device 102 can receive a customer input for ordering an item at a merchant or a kiosk located in the venue 204. A kiosk is a point of sale location that is equipped with a merchant device and that sells goods or services. In the example shown, the venue 204 has kiosk 206 "ABC Food" and kiosk 208 "DEF Ice Cream." The customer device 102 receives an order of a food item sold at kiosk 206. The customer device 102 adds the item to a list of ordered items in of the tab. The customer device 102 can then perform various operations related to or unrelated to buying items at the venue 204.

After placing the order, the customer may carry the customer device 102 from location 203 to kiosk 206 along path 210 to pick up the ordered item. Along the way, the customer device 102 stops at a second kiosk 208. The kiosk 208 may or may not be operated by a same merchant who operates the kiosk 206.

The customer carrying the customer device 102 decides to buy an item, e.g., an ice cream, at the kiosk 208. The customer can enter the kiosk 208 or move sufficiently close to a merchant device operating in the kiosk 208 such that the customer device 102 detects a presence of the merchant device. The customer device 102 can send a signal to a server, which, in turn, sends a notification to the merchant device to notify the presence of the customer device 102. The notification can include an identifier, e.g., a name of the customer, and an authentication image, e.g., a photo of the customer. The merchant device can display a user interface of the open tab, including displaying the identifier and authentication image. A cashier at the kiosk 208 may add a record of purchasing the ice cream to the tab using the merchant device. The customer need not approve payment for the ice cream at the merchant device or at the kiosk 208. The payment may have been previously approved when the customer created the tab, or approved at a later time. The customer device 102 may or may not display the added record when the customer is at kiosk 208. The customer then exits the kiosk 208 and continues to walk to the kiosk 206, where the customer originally ordered a food item.

By the time the customer reaches kiosk 206, the food item originally ordered may be ready for pick up. Before the customer walks to the pickup area, the customer may see another food item that the customer wishes to purchase. The customer can activate the digital wallet program on customer device 102 to display a user interface of the open tab, and then add the new item to the open tab using the interface. Alternatively, the customer can bring the new item to the pickup area, where a merchant device is located. The customer device 102 detects the presence of the merchant device. In response, the customer device 102 causes, through a server, the merchant device to display a user interface listing the item that the customer pre-ordered. If the merchant device at the kiosk 206 and the merchant device at kiosk 208 are merchant devices linked to a same merchant account, the merchant device can also list the item that the customer bought at kiosk 208, to allow a sales person at kiosk 206 to make suggestions for add-on items for the item that the customer bought at kiosk 208.

The merchant device located at kiosk 208 may add an item, e.g., the item that the customer brought to the merchant device or the add-on item, to the list of the open tab. The merchant device can push the update to the tab to the customer device 102. The customer can open the digital wallet application on the customer device 102 and pay for all items at once, or leave the digital wallet application executing as a background process.

The customer device 102 is then carried to location 214. The customer device 102 determines that the location 212 is at or near the edge of the venue 204, and that a traveling trajectory 214 of the customer device 102 indicates that the customer device 102 is leaving or about to leave the venue 204, which is associated with the open tab. In response, the customer device 102 can display an alert and a user interface for paying the items bought at various locations in venue 204 and closing the tab. The user interface allows the customer to buy items in multiple purchase transactions and pay for the items in a single payment transaction.

FIGS. 3A and 3B illustrate example user interfaces of a customer device for initiating an open tab transaction. The user interfaces can be displayed on a customer device, e.g., customer device 102 of FIG. 2. The example shown in FIGS. 3A and 3B is part of a process where an open tab is created in association with a pick up order where a customer pre-orders an item at a location, e.g., home or office, that is different from a location of a merchant, and visits the merchant later to pick up that item. In other implementations, the open tab can be created when the customer brings the customer device to a merchant and buys an item from the merchant through a merchant device. The open tab can be created by the customer device or the merchant device.

FIG. 3A illustrates an example user interface 301 for launching of an open tab digital wallet program. Through prior registration, the digital wallet program has already been linked to a payment card. The customer device receives a user input launching the digital wallet program having open tab functions. The customer device determines that the customer device is located in a venue, e.g., venue 204 of FIG. 2 ("XYZ Stadium"). The customer device can determine, or obtain information from application server 110 (of FIG. 1) indicating, that multiple kiosks or merchants are located at the venue. The customer device can display option item 302 for creating an open tab for the venue, and option item 304 for creating a conventional tab for paying each individual purchases separately in the user interface 301. Upon receiving a user input, e.g., a touch input on option item 302, the customer device displays a vendor selection user interface 306 for selecting a kiosk or a merchant.

FIG. 3B illustrates an example vendor selection user interface 306. The customer device can determine, or obtain from application server 110 (of FIG. 1) identifiers of the kiosks or merchants located at the venue. The customer device can display in the vender selection user interface 306 a vendor option item 308 associated with a first kiosk or first merchant, and vendor option item 310 associated with a second kiosk or second merchant. Upon receiving a user input selecting the vendor option item 308, the customer device can display an item selection user interface, which is described in additional details in reference to FIG. 4A.

FIGS. 4A and 4B illustrate example user interfaces for placing a first order in an open tab transaction. The user interfaces can be displayed on a customer device, e.g., customer device 102 of FIG. 2.

FIG. 4A illustrates an example item selection user interface 402. The item selection user interface 402 can include a list of items offered at a kiosk or merchant. The item selection user interface 402 can include selection user interface items 404, 406, 408, and 410, each corresponding to an item. Upon receiving a selection input, e.g., a touch input on selection user interface item 406, the customer device can put a record of an item represented by that selection user interface item in a virtual shopping basket.

FIG. 4B illustrates an example shopping basket user interface 412. The shopping basket user interface 412 includes various user interface items indicating, for example, a name of the kiosk or merchant offering the selected item, a location of the kiosk or merchant within the venue, a price of the item, a tax amount, a tip amount, and a total amount. The shopping basket user interface 412 includes an order placement user interface item 414 for creating an open tab. The order placement user interface item 414 can be labeled "Place Order."

FIG. 5 illustrates an example user interface 502 for displaying an estimated ready time. The user interface 502 can be displayed on a customer device, e.g., customer device 102 of FIG. 2. Upon receiving an input for creating an order, for example, through the order placement user interface item 414 of FIG. 4, the customer device can submit the order to a merchant device or cause a server, e.g., the application server 110 of FIG. 1, to submit the order. The merchant device, upon receiving and accepting the order, can receive a merchant input on how long it takes for the merchant to prepare the ordered item. For example, the order can list one item of "mini pizza" at "ABC Food" kiosk at venue "XYZ Stadium." The merchant device at "ABC Food" kiosk can receive the order. The merchant device then receives an input from the merchant specifying that the item will take 15 minutes to prepare. The merchant device can calculate an expected time of readiness based on a current time, e.g., 3:00 pm and the time to prepare. The merchant device can send the expected time of readiness to the customer device, which, can display the expected time of readiness on user interface 502.

FIG. 6 illustrates an example user interface 602 for providing an alert. The user interface 602 can be displayed on a customer device, e.g., customer device 102 of FIG. 2. The alert indicates to a customer that, if the customer starts moving to the vender to pick up the ordered item, the item will be ready when the customer reaches the vendor. The customer device can determine a first location of the customer device. Based on the first location of the customer device, a second location of the kiosk or merchant offering the ordered item, and a virtual map of the venue where the customer device and kiosk or merchant is located, the customer device, or a server connected to the customer device, can calculate a distance between the first location and the second location. The customer device or server can then calculate an estimated time for reaching the second location, e.g., 5 minutes. The customer device can then provide an alert from display in user interface 602 X minutes before the expected time of readiness, e.g., at 3:10 pm.

Figure 7A:
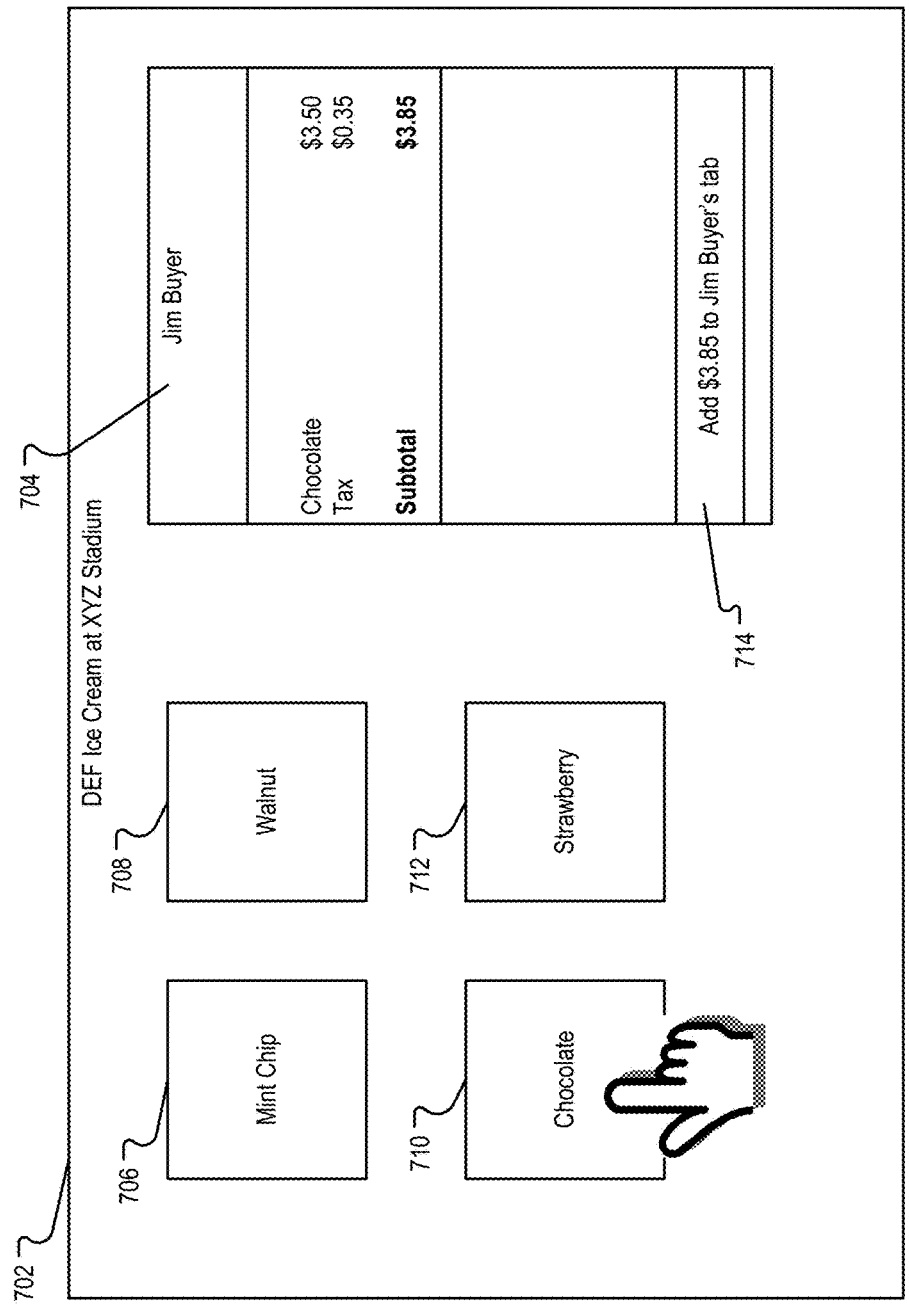
FIG. 7A illustrates an example user interface of a merchant device for processing a second order in an open tab transaction.

FIG. 7A illustrates an example user interface 702 of a merchant device for processing a second order in an open tab transaction. The merchant device can be a merchant device operating at kiosk 208 (of FIG. 2). A customer who is a user of customer device 102 carries the customer device 102 to kiosk 208 on the way to kiosk 206 (of FIG. 2) to pick up an ordered item. The customer device may have the digital wallet application executing as a background process.

The customer device 102 can detect presence of the merchant device, for example, by using a radio frequency (RF) signals, e.g., Bluetooth™ low energy (BLE) device signals. The customer device 102 can communicate with the merchant device, directly or through an application server storing account information of the customer of the customer device 102. The digital wallet application executing as a background process on the customer device, or the server, can inform the merchant device that customer device 102 has an open tab. In response, the merchant device can display a user identifier 704 in the user interface 702. The user of customer device 102 requests, at the merchant device, to buy an item and adds the item to the open tab.

The user interface 702 can include user interface items 706, 708, 710, and 712. Each of the user interface items 706, 708, 710, and 712 represents an item available at the kiosk 208. The merchant device can receive a user input selecting an item, e.g., by receiving a touch input on user interface item 710. In response, the merchant device can display in the user interface 702 a name of the item, a price of the item, a tax amount, and a total amount for buying the selected item.

The merchant device can display user interface item 714 for adding a record of the transaction, including an identifier of the item and the total amount, to the open tab. Upon receiving an input through user interface item 714, the merchant device, or an application server that manages the transaction, pushes the record to the customer device 102. The merchant device can then close the user interface 702 on the merchant device. The tab may remain open for the customer device 102.

Figure 7B:
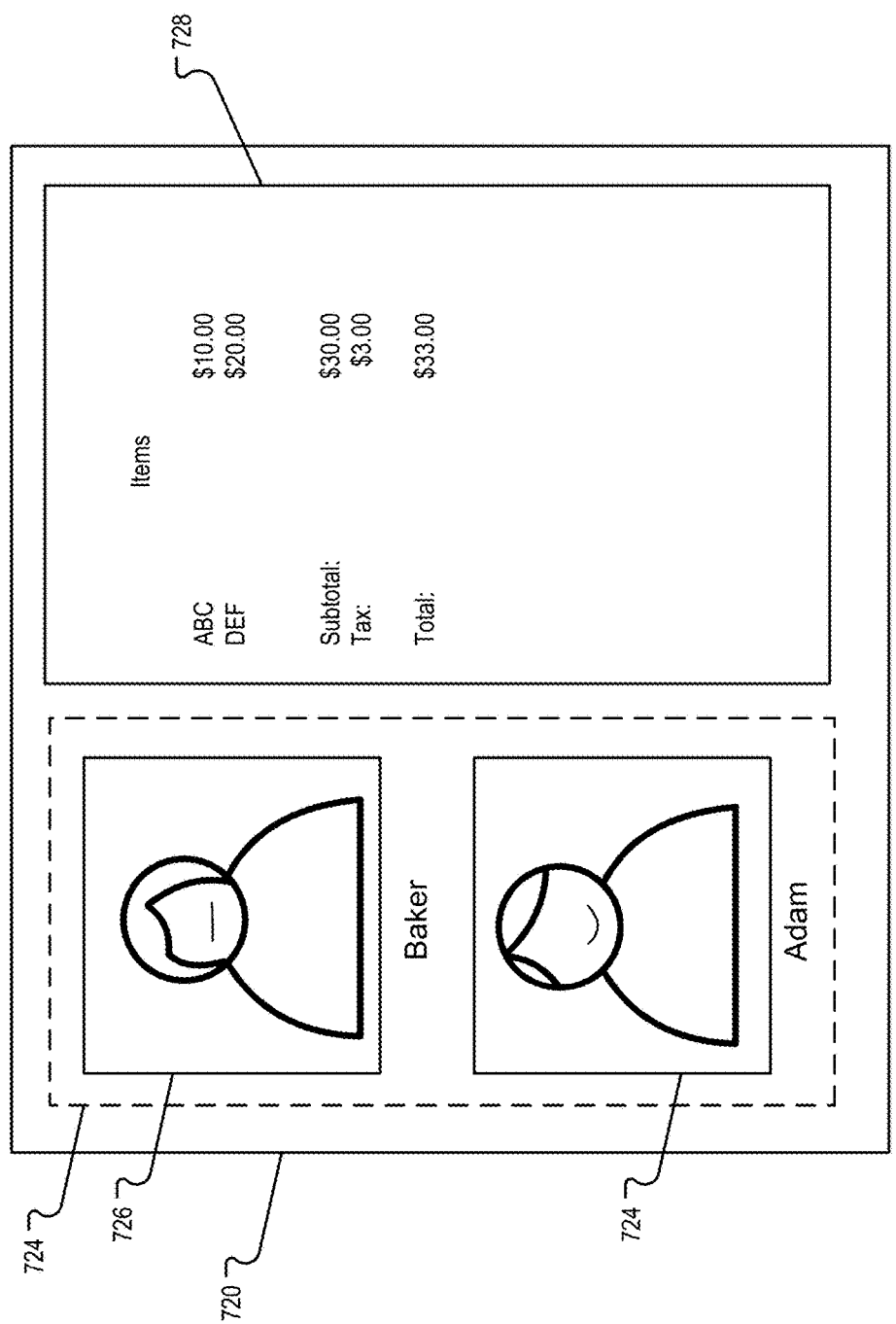
FIG. 7B illustrates an example user interface of a merchant device for processing a pickup transaction.

FIG. 7B illustrates an example user interface 720 of a merchant device for processing a pickup transaction. A customer can select one or more items to purchase from a merchant. The customer Adam can make the selection on a customer device, e.g., the customer device 102 (of FIG. 2). The customer device can submit a request to purchase to a server. The server can provide purchase data to a merchant device operated by the merchant, and notify the merchant that the customer will arrive at the merchant to pick up the selected items. The purchase data can include a list of the selected items.

Together with the purchase data, or separately, the server can submit an identity verification record, e.g., a name associated with an image, of the customer to the merchant device. The merchant device can display the identity verification record, including the name and image 722 in the user interface 720. The user interface 720 can include an identity verification record list 724 that displays image 722 and image 724 of another customer. The list 724 may be ordered by priority of each customer.

In the example shown, another customer Baker may have submitted a request to purchase items before customer Adam did, or may have an estimated arrival time at the merchant device that is earlier than customer Adam. Accordingly, image 726 of customer Baker has a higher priority than image 722. The merchant device can display an image associated with a higher priority more prominently than a picture associated with a lower priority. For example, the merchant device can display image 726, in association with the name, higher than image 722 in the list 724.

The merchant device can receive a notification that a customer device of customer Adam is located in proximity with the merchant device. The merchant device can determine that customer Adam arrived ahead of customer Baker. In response, the merchant device can change priorities of image 722 and image 726, including increasing the priority of image 722. As a result, the merchant device can display image 722 at a more prominent location, e.g., by switching places of image 722 and image 726. A merchant can use image 722 and image 726 to authenticate a person that requests to pick up the selected items.

The merchant device can display item list 728 in user interface 720. The item list 728 can include a list of items selected by the customer for purchase, and price of the items. The merchant device can display the item list 728 before the customer arrives at the merchant device such that a merchant operating the merchant device has time to prepare the items for pick up. The merchant device can display the item list 728 upon receiving the notification that a customer device of the customer is located in proximity with the merchant device such that the merchant or the customer can change the list of selected item. Upon receiving an input by the customer or by the merchant to change the list, the merchant device can display a changed list, including a changed total price. Upon approval, the merchant device can submit the total price to a server for processing.

FIG. 8 illustrates an example user interface 802 for placing a third order in an open tab transaction. The user interface 802 can be displayed on a customer device, e.g., customer device 102 of FIG. 2. A customer carrying the customer device 102 reaches the kiosk 206 (of FIG. 2) that provides the item originally ordered. Before the customer device 102 moves to the counter where a merchant device is located, the customer browses the kiosk 206 and finds a new item that the customer intends to buy. The customer, or an employee at the kiosk 206, can bring the new item to the merchant device. The merchant device may display a user interface for adding the item to the open tab.

Alternatively, the customer can add the item to the open tab using the customer device 102. The customer turns on customer device 102 and launches the digital wallet program to check price of the new item. In some implementations, the digital wallet program with an open tab may already be executing as a background process. The launch can bring the background process to the foreground, e.g., by displaying the user interface 802 of the digital wallet program. The customer device 102 can determine that the customer device 102 is located at kiosk 206. Upon launch, the digital wallet program of the customer device 102 can display items sold at the kiosk 206, based on the location information. For example, the customer device 102 can display user interfaces items 804, 806, 808, and 810, each corresponding to an item. The customer device 102 can receive a selection input, e.g., a touch input on user interface item 808. In response, the customer device 102 can add the corresponding item to the open tab.

FIG. 9 illustrates an example user interface 902 for closing an open tab. The user interface 902 can be displayed on a customer device, e.g., customer device 102 of FIG. 2. The customer device 102 can display the user interface 902 upon determining that the customer device 102 is leaving or about to leave the venue associated with the open tab, or upon receiving a user input for closing the open tab.

User interface 902 can include multiple sub-summary sections, each corresponding to a different kiosk or merchant located at the venue. For example, user interface 902 includes a sub-summary section 904 for a first kiosk, kiosk 208 (of FIG. 2), and sub-summary section 906 for a second kiosk, kiosk 206 (of FIG. 2). Each of the sub-summary sections 904 and 906 can include a name of the kiosk or merchant, and a subtotal amount of purchase at that kiosk or merchant. Each of the sub-summary sections 904 and 906 can receive a selection input, e.g., a touch input. Upon receiving the input, e.g., at the sub-summary section 906, the sub-summary section 906 can expand to display a list of all items purchased at the corresponding kiosk or merchant, their prices, a tax amount, and a tip amount, if applicable. The sub-summary section 906 can receive a user input to select and change the tip amount.

The user interface 902 can include a display field 908 for displaying a grand total amount spent at the venue associated with the open tab. The grand total can include a combined amount of purchases at various kiosks or merchants at the associated venue. The user interface 902 includes virtual button 910 for exiting the user interface 902 and virtual button 912 for approving payment for all items and closing the open tab.

Figure 10:
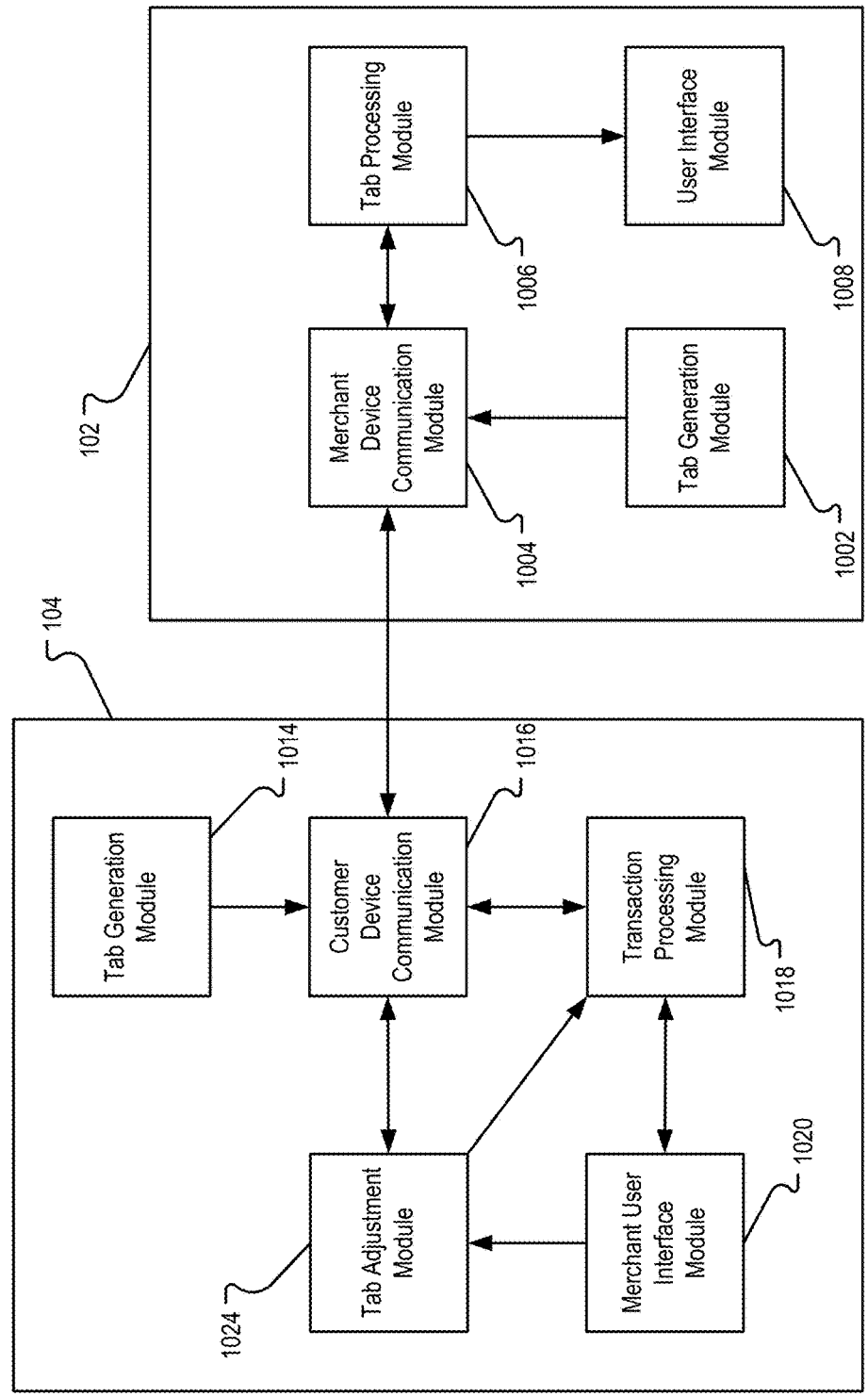
FIG. 10 is a block diagram illustrating components of an example system for processing open tab transactions.

FIG. 10 is a block diagram illustrates components of an example system for processing open tab transactions. The system can include a merchant device 104 and one or more customer devices 102. Each of the merchant device 104 and customer device 102 can include one or more processors and a storage device storing instructions operable to cause the one or more processors to perform open tab transaction operations.

The customer device 102 includes a tab generation module 1002. The tab generation module 1002 is a component of the customer device 102 operable to receive input from a customer for placing an order of goods or services, or receive a request from a merchant device for approving a purchase of an item. In response, the tab generation module 1002 can determine whether the customer device 102 is located at a venue including multiple kiosks or merchants, or if the merchant the customer is ordering from is located at such a venue. If yes, the customer device 102 can generate an open tab. The customer device can submit the open tab to the merchant device 104 through a merchant device communication module 1004.

The merchant device communication module 1004 is a component of the customer device 102 configured to communicate with the merchant device 104, directly or through a server, to submit an open tab or receive a push notification for updating an open tab. The merchant device communication module 1004 can include hardware and software for conducting wired or wireless communications.

The merchant device communication module 1004 can submit updates to an open tab received by the merchant device communication module 1004 from the merchant device 104 to a tab processing module 1006. The tab processing module 1006 is a component of the customer device 102 configured to modify an open tab, including adding or deleting items from the open tab, designating tip amount, and adjusting tip amount. The tab processing module 1006 can close an open tab and process payment for a closed open tab, including submitting the payment to a payment subsystem of the customer device 102. The tab processing module 1006 can interact with a user interface module 1008. The user interface module 1008 is a component of the customer device 102 configured to display user interface as described above in reference to FIG. 3A through FIG. 9.

The merchant device 104 includes a tab generation module 1014. The tab generation module 1014 is a component of the merchant device 104 operable to receive input from a merchant or merchant employee specifying an item purchased in a transaction and a price of each item. The tab generation module 1014 then generates an open tab, which can be modified by the customer device 102 or other merchant devices located in a same venue where the merchant device 104 is located. A customer device communication module 1016 can push the open tab to the customer device 102 through the merchant device communication module 1004.

The customer device communication module 1016 is a component of the merchant device 104 configured to communicate with the customer device 102, directly or through a server, through a wired or wireless connection. The customer device communication module 1016 can receive an open tab from the customer device 102. In response, the customer device communication module 1016 can provide details of the open tab, including the item ordered as listed in the open tab, to a transaction processing module 1018. The transaction processing module 1018 is a component of the merchant device 104 configured to process an open tab transaction, including providing the list for display and interacting with an online payment service to process charges.

The merchant device 104 includes a merchant user interface module 1020. The merchant user interface module 1020 is a component of the merchant device 104 configured to display a list of items in an open tab, and add new items or delete already ordered items from the list. If the list of items has changes, the merchant user interface module 1020 can provide the changes to a tab adjustment module 1022 for further processing.

The tab adjustment module 1022 is a component of the merchant device 104 configured to modify an open tab based on information received from the merchant user interface module 1020, or to receive modification from the customer device 102 through the customer device communication module 1016. In response, the tab adjustment module 1022 modifies the open tab accordingly. The tab adjustment module 1022 can send the modified list to the transaction processing module 1018 for further processing.

Figure 11:
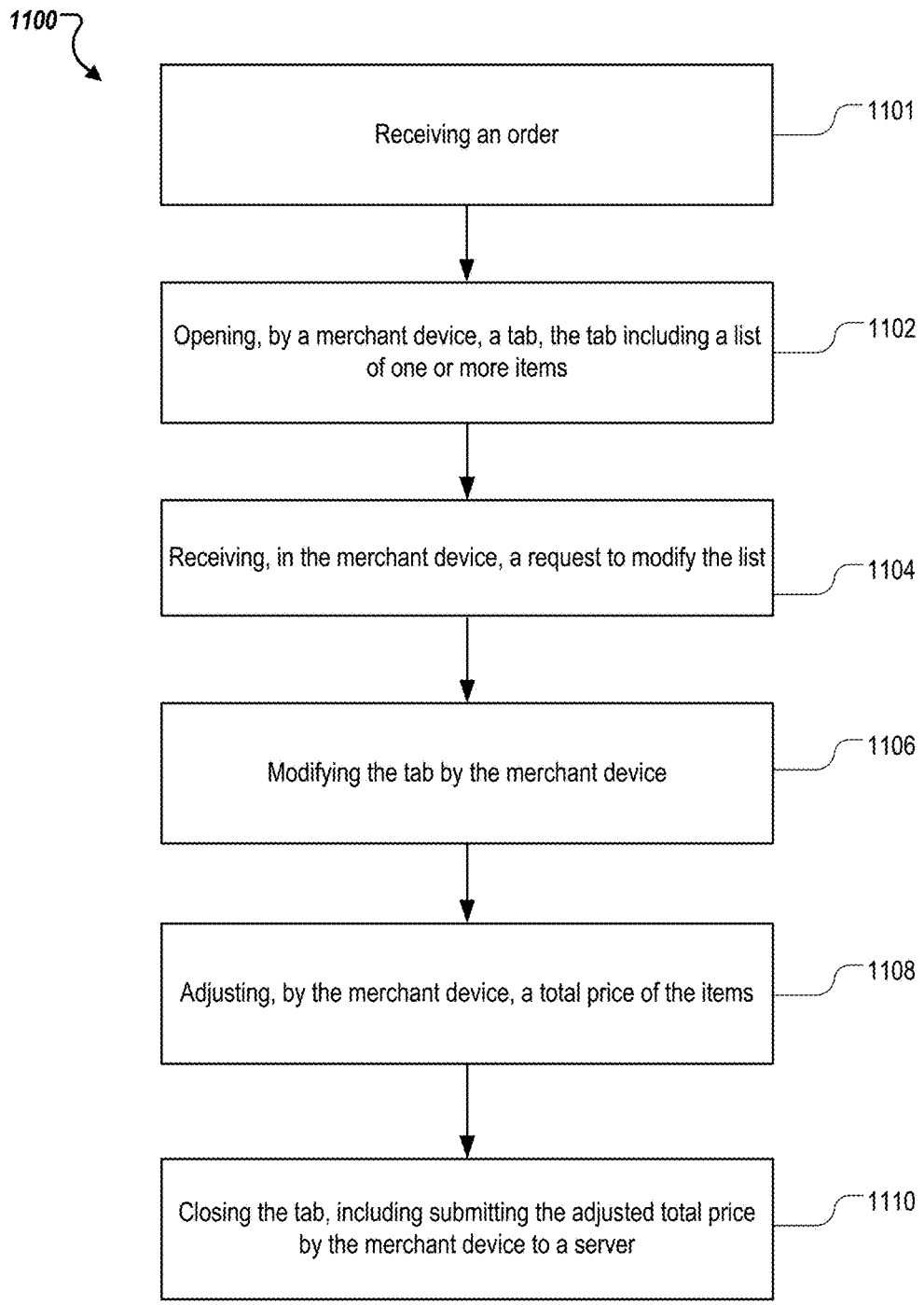
FIG. 11 is a flowchart of an example process of modifying an open tab.

FIG. 11 is a flowchart of an example process 1100 of modifying an open tab. The process 1100 can be performed by the merchant device 104 of FIG. 1.

The merchant device 104 receives (1101) an order of one or more goods or services. The order can indicate that a customer will come to a location of the merchant device 104 at a future time.

After receiving the order and after a period of time has passed, a customer device, e.g., the customer device 102 of FIG. 2 can detect a presence of the merchant device by detecting an RF signal of a beacon coupled to the merchant device. The customer device 102 can notify a server, e.g., the payment service system 108 of FIG. 1. The server can alert the merchant device 104. In response to the alert, the merchant device can open (1102) a tab. The tab is a data structure that specifies a transaction between a customer carrying the customer device and a merchant operating the merchant device, including the order of goods or services. The tab includes a list of the ordered one or more goods or services. The tab may be created by the customer device, the merchant device 104, or the payment service system 108. The tab may be stored on the customer device, the merchant device 104, or the payment service system 108. Opening the tab includes providing for display a user interface of the tab on the merchant device.

The merchant device 104 receives (1104) a request to modify the list from a user interface on merchant device 104 or from the customer device. The request can be one of a request to add a new item to the list or a request to remove an already ordered item from the list.

In response, the merchant device 104 modifies (1106) the tab, including adding a new the new item, removing the already ordered item, or both. The merchant device 104 adjusts (1108) a total price of the items ordered as resulted from adding the new item or removing the already ordered item.

The merchant device 104 can receive a request from the customer or from the merchant to close the tab, or upon receiving an alert indicating a departure of the customer device from the merchant device 104. In response, the merchant device 104 closes (1110) the tab, including closing the user interface and submitting the adjusted total price to a server for processing a financial transaction, authorizing the financial transaction, or both, for the items finally purchased.

Figure 12:
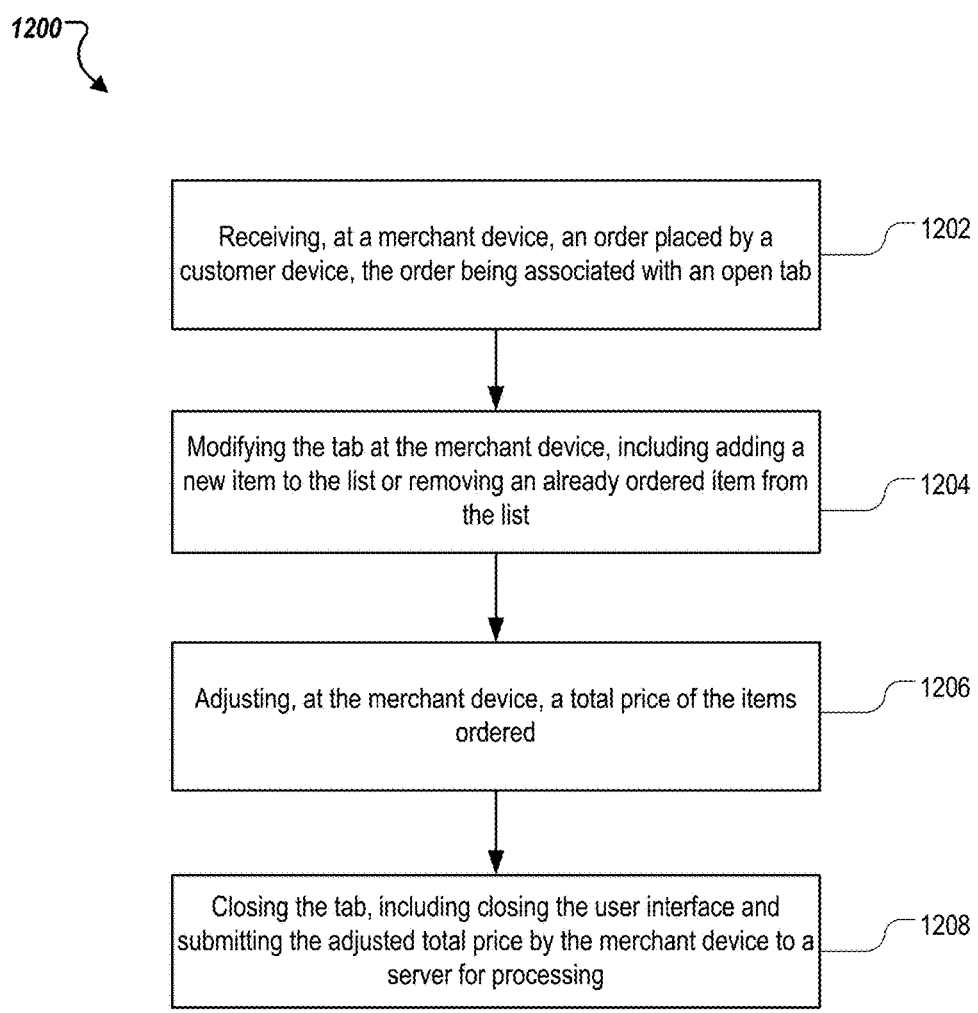
FIG. 12 is a flowchart of an example process of modifying an open tab.

FIG. 12 is a flowchart of an example process 1200 of modifying an open tab. Process 1200 can be performed by the merchant device 104 of FIG. 1.

The merchant device 104 receives (1202) an order placed by a customer device, the order including a list of one or more goods or services, the order being associated with an open tab. The order may be placed at a location that is remote from the merchant device 104. The merchant device 104 displays a first user interface for processing the order. The first user interface displays a record of the order. The first user interface can include an estimated time of arrival of the customer device at the merchant device 104 from a location where the order was placed or from a location specified by the customer who placed the order. The merchant device 104 can receive a merchant input for processing the order, e.g., for accepting the order. The open tab can be created on the customer device through a digital wallet program executing on the customer device, or created on a server through a user interface displayed on the customer device by the digital wallet program. The digital wallet program is configured to associate the customer device with a payment card, e.g., a credit card, debit card, gift card, or reward card.

The merchant device 104 modifies (1204) the tab at the merchant device, including adding a new item to the list or removing an already ordered item from the list through a second user interface displayed at the merchant device. The second user interface can be a user interface for modifying the order. Displaying the second user interface can be triggered by a detection of the customer device by the merchant device, which occurred after the merchant accepted the order. The second user interface can include a list of the one or more items. The merchant device 104 can display the second user interface on a touch-sensitive display screen of the merchant device 104. Modifying the tab is triggered by receiving an input on the touch-sensitive display screen of the merchant device 104 for adding a new item or deleting an already ordered item.

The merchant device 104 adjusts (1206) a total price of the items ordered as resulted from the adding or removing. Adjusting the total price can include changing a displayed previous order amount to a new total amount. After adjusting the total price, the merchant device 104 can push the adjusted total price from the merchant device 104 to the customer device or cause a server to push the adjusted total price from the merchant device 104 to the customer device.

The merchant device 104 closes (1208) the tab. Closing the tab includes closing the user interface and submitting the adjusted total price by the merchant device to a server for processing. The server can include one or more computers programmed to process transactions using information of a payment card associated with a digital wallet application program of the customer device. In some implementations, upon receiving a request to close the tab from a customer or from a merchant, or upon a notification of a departure of the customer device from the merchant device and before closing the tab, the merchant device 104 or the server can determine that a time window from adding a tip amount to the tab is still open. In response, the merchant device 104 or the server can provide for display on the merchant device 104 or on the customer device a user interface for adding tip payment to the tab.

Figure 13:
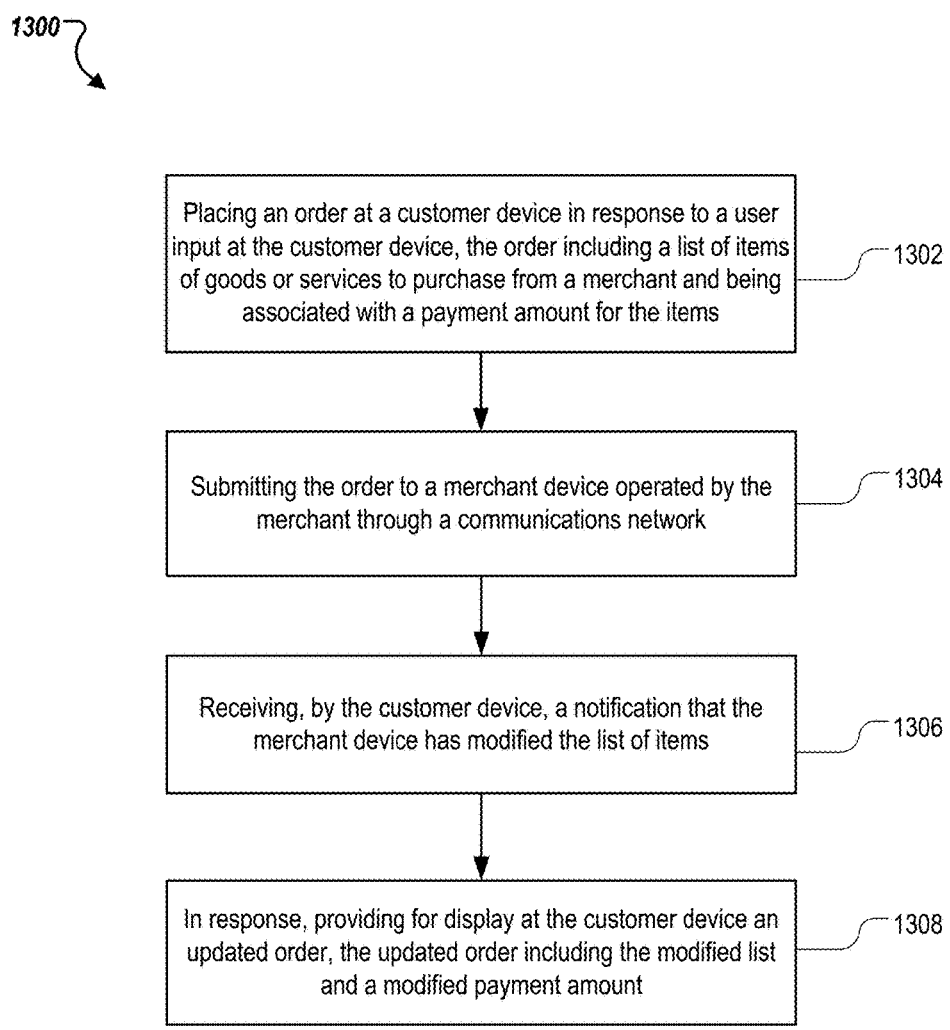
FIG. 13 is a flowchart of an example process of pushing modifications of an open tab to a customer device.

FIG. 13 is a flowchart of an example process 1300 of pushing modifications of an open tab to a customer device. A customer device 102 (of FIG. 2) can create (1302) an order in response to a user input at the customer device 102. The order includes a list of goods or services to purchase from a merchant. The order is associated a payment amount of the items. A location where the customer device 102 creates the order may be the same as, or different from, a location of the merchant selling the goods or services.

The customer device 102 submits (1304) the order to a merchant device, e.g., the merchant device 104 of FIG. 1, operated by the merchant through a communications network. The order can specify that a user of the customer device 102 will pick up the ordered items at the merchant at a future time.

When the customer reaches the merchant, the customer device or the merchant device can detect that the customer device and the merchant device are located in proximity with one another, e.g., within X feet of one another. The detection causes a server, or the customer device, to send an alert to the merchant device. The alert triggers the merchant device to display a user interface for processing the order. The merchant may modify the order on the user interface, for example, by adding a new item in response to a request from the customer in the user interface. In response, the customer device receives (1306) a notification from the merchant device or from a server processing the order.

In response to the notification, the customer device can provide (1308) an updated order for display at the customer device. The updated order can include the modified list of items and a modified payment amount. The customer device can receive a user input approving the updated order and the modified payment amount. In response to the input, the customer device can close the order, including preventing the merchant device from further modifying the order.

Figure 14:
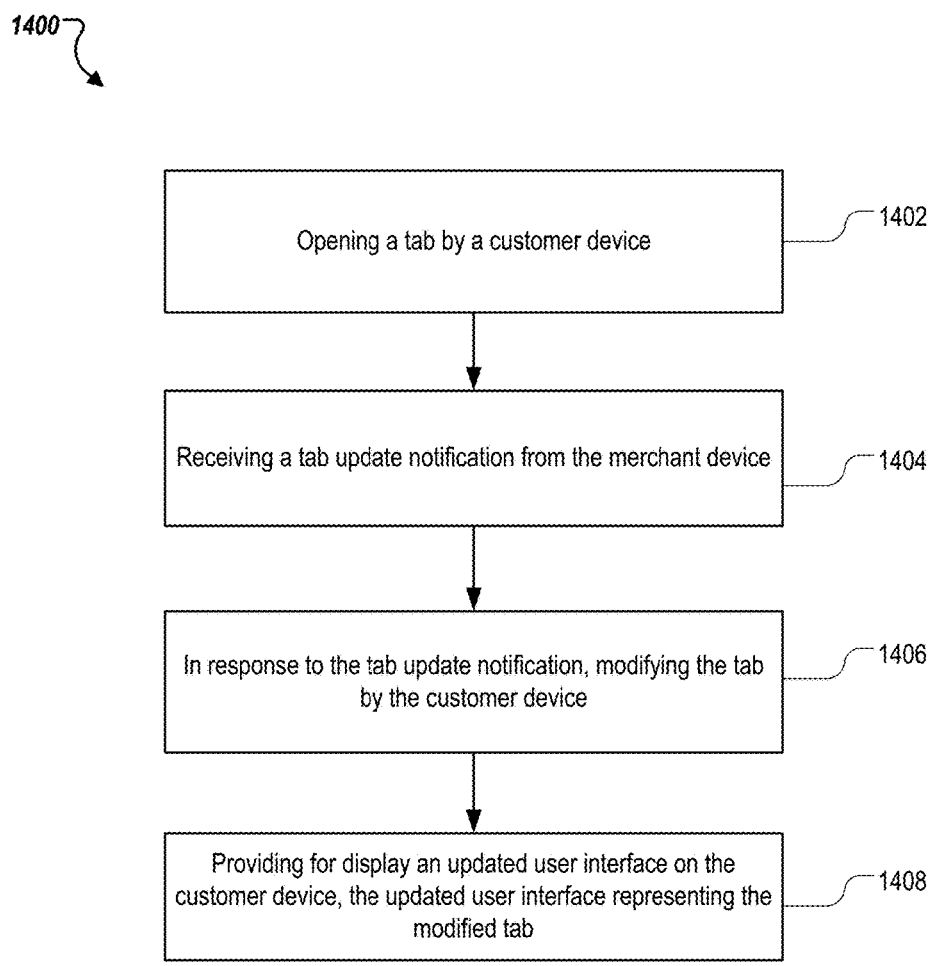
FIG. 14 is a flowchart of an example process of pushing modifications of an open tab to a customer device.

FIG. 14 is a flowchart of an example process 1400 of pushing modifications of an open tab to a customer device. The process 1400 can be performed by the customer device 102 of FIG. 2.

The customer device 102 can open (1402) a tab. The tab is a data structure that specifies a transaction between the customer device and a merchant device. The tab includes a list of one or more goods or services a customer ordered from a merchant in the transaction. The tab can be created, on the customer device 102 or on a server, through a digital wallet program executing on the customer device 102. The digital wallet program is configured to associate the customer device 102 with a payment card. Opening the tab includes providing for display a user interface of the tab on the customer device 102.

The customer device 102 can receive (1404) a tab update notification from the merchant device or a server. The tab update notification indicates that the merchant device has received a request to modify the list. The request can include at least one of a request to add a new item to the list or a request to remove an already ordered item from the list. The server includes one or more computers programmed to process transactions using information of the payment card.

Opening the tab can occur before the customer device 102 reaches a proximity distance from the merchant device. Receiving the tab update notification occurs after customer device reaches the proximity distance from the merchant device. The proximity distance can correspond to a detection range of a radio frequency (RF) signal from a signal source.

In response to the tab update notification, the customer device 102 modifies (1406) the tab. Modifying the tab includes at least one of adding the new item or removing the already ordered item. Modifying the tab by the customer device can be performed by a background process executing on the customer device 102, e.g., the digital wallet program, or by a server remotely connected to the customer device 102.

The customer device 102 provides (1408) for display an updated user interface on the customer device 102. The updated user interface represents the modified tab. Providing for display the updated user interface can include providing for display a user interface item for adding tips for each item in the list. The customer device 102 can submit submitting a transaction processing request to a server programmed to process transactions of a payment card upon receiving a user input through the updated user interface indicating that payment for each item in the list of the tab is approved.

Figure 15:
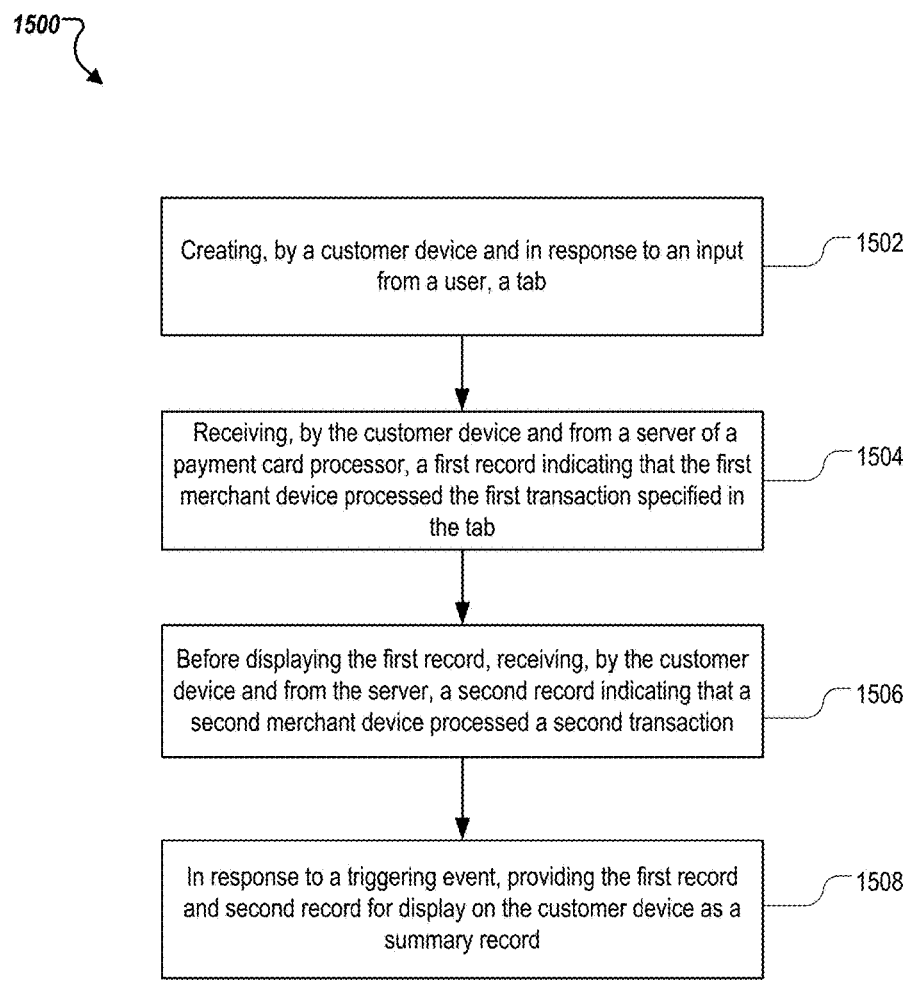
FIG. 15 is a flowchart of an example process of an open tab transaction at multiple locations.

FIG. 15 is a flowchart of an example process 1500 of an open tab transaction at multiple locations. The process 1500 can be performed by the customer device 102 of FIG. 2.

The customer device 102 creates (1502), in response to an input from a customer, a tab. The tab includes a data structure that specifies a first transaction between the customer and a merchant operating a first merchant device at a venue. The venue can be a place where multiple kiosks or merchants are located. The first transaction includes a purchase of a first item. The tab includes an indication that the customer device will process multiple transactions at the venue by making a single payment.

The customer device 102 receives (1504) from a server of a payment card processor, a first record. The first record indicates that the first merchant device processed the first transaction specified in the tab during a time when the customer device was located in proximity with the first merchant device.

Before displaying the first record, the customer device 102 receives (1506) from the server, a second record indicating that a second merchant device processed a second transaction in which a second item was purchased during a time when the customer device was located in proximity to the second merchant device. The second record includes a second payment amount. The first merchant device and second merchant device are located at different locations at the venue. For example, each of the first merchant device and the second device can be located at a different kiosk or merchant. The second transaction occurred after the first transaction occurred.

In response to a triggering event, the customer device 102 provides (1508) the first record and second record for display on the customer device 102 as a summary record that includes a sum of the first payment amount and the second payment amount. The triggering event includes at least one of a user request for closing the tab by making the single payment or a determination that the customer device 102 leaves the venue.

Figure 16:
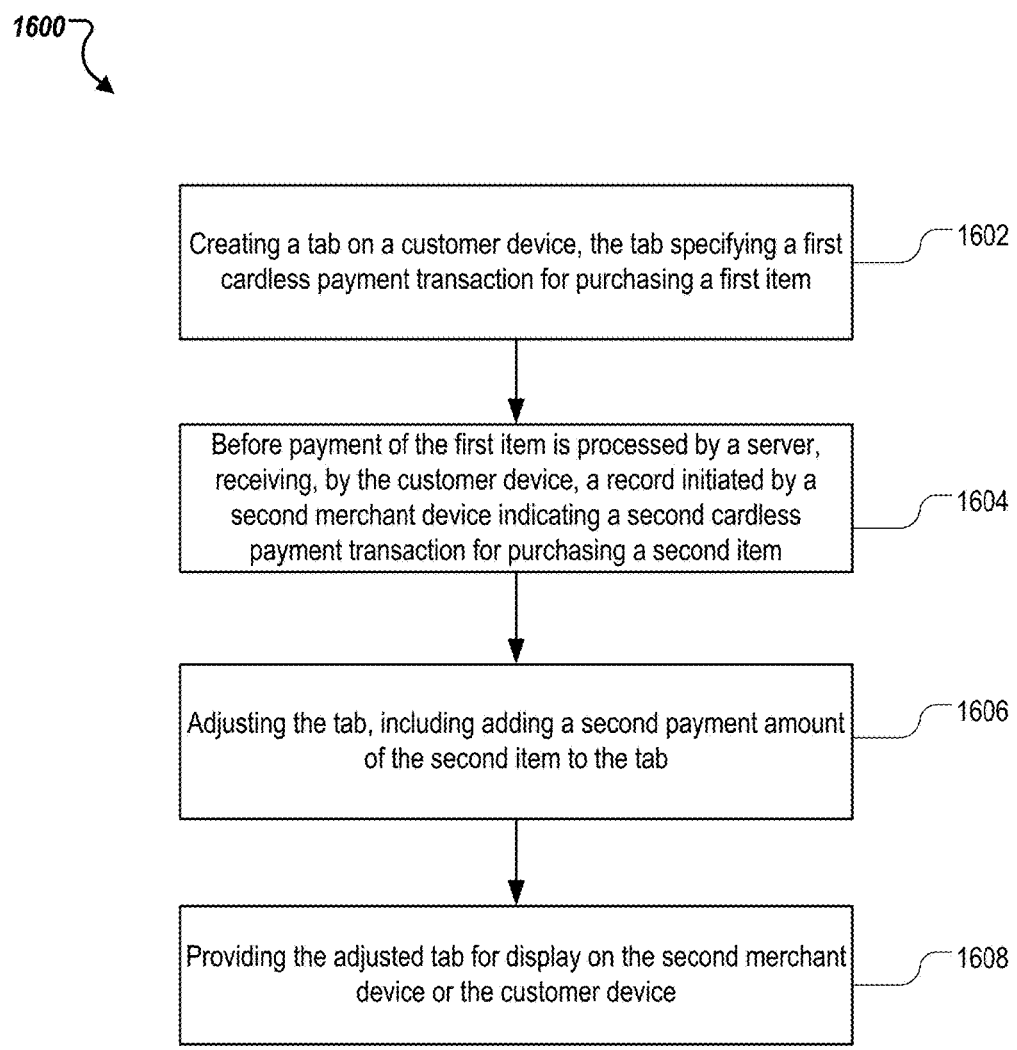
FIG. 16 is a flowchart of an example process of an open tab transaction at multiple locations.

FIG. 16 is a flowchart of an example process 1600 of an open tab transaction at multiple locations. The process 1500 can be performed by the customer device 102 of FIG. 2.

The customer device 102 creates (1602) a tab on the customer device 102. The tab specifies a first payment transaction for purchasing a first item through communication between the customer device and a first merchant device. The purchase is specified to have a first payment amount. The customer device 102 can create the tab using a digital wallet program executing on the customer device 102. The digital wallet program links a financial account of the customer, an account of a merchant operating the first merchant device and an account of a merchant operating the second merchant device. The merchant operating the first merchant device and the merchant operating the first merchant device can be a same merchant or different merchants. The first merchant device can be located in a first kiosk of a merchant where a first category of goods or services are sold by the merchant.

Creating the tab can include the following operations. The customer device 102 receives a user input for placing an order. The customer device 102 determines a current location of the customer device 102. The customer device 102 determines that the current location is inside a geofence associated with the venue according to a stored geometry and geographic location of the venue. The customer device 102 obtains a set of records one or more merchants operating at the venue or one or more kiosks of a merchant operating at the venue. The customer device 102 then creates the tab upon receiving, from the customer, a selection of the merchant or kiosk, and a selection of the first item.

Before payment of the first item is processed by a server, the customer device 102 receives (1604) a record initiated by a second merchant device indicating a second payment transaction for purchasing a second item through communication between the customer device and the second merchant device. The second payment transaction can be approved by a spatial proximity between the customer device and the second merchant device. The second merchant device can be located in second kiosk of a merchant operating the first kiosk. The second kiosk can be a place where a second category of goods or services are sold by the merchant. The digital wallet program links a financial account of the customer, an account of a merchant operating the first merchant device and an account of a merchant operating the second merchant device. The merchant operating the first merchant device and the merchant operating the first merchant device can be a same merchant or different merchants.

The second item can be purchased in a transaction triggered by detection of the customer device 102 by the second merchant device, or by detection of the second merchant device by the customer device. In the transaction, a user interface for viewing or modifying the tab can be displaying on the second merchant device. The second merchant device is located in second kiosk of the merchant where a second category of goods or services are sold by the merchant.

The customer device 102 adjusts (1606) tab, including adding a second payment amount of the second item to the tab. The customer device 102 provides (1608), or causes a server to provide, the adjusted tab for display on the second merchant device or the customer device upon determining, by the second merchant device, the customer device, or the server, that the second merchant device and the customer device are located in proximity to one another. The adjusted tab includes a summary record. The summary record includes the first payment amount and the second payment amount. The digital wallet program may execute as background process on the customer device after creating the tab and before providing the summary record for display, including during the time when the customer device was located in proximity with the first merchant device and during time when the customer device was located in proximity to the second merchant device.

Figure 17:
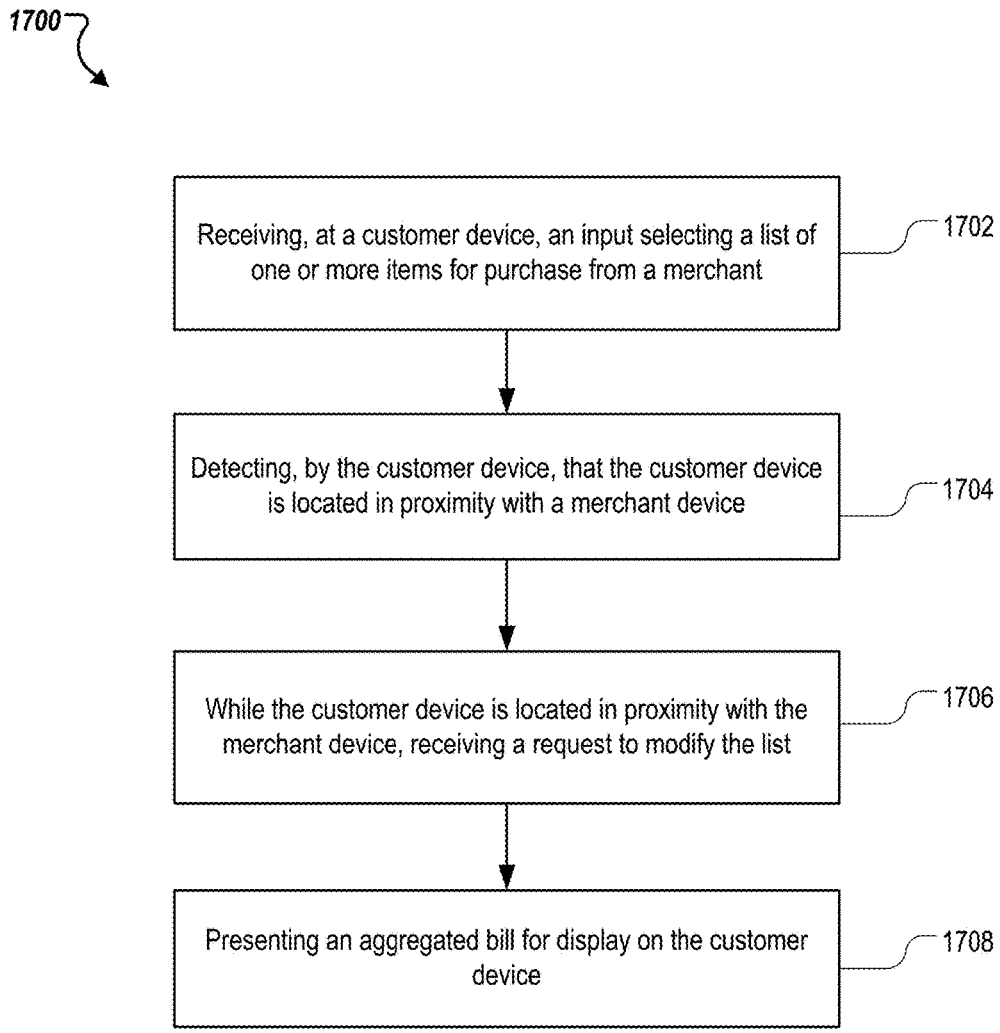
FIG. 17 is a flowchart of an example process of modifying an open tab performed by a customer device.

FIG. 17 is a flowchart of an example process 1700 of modifying an open tab performed by a customer device. The customer device can be the customer device 102 of FIG. 2.

The customer device can receive (1702) an input from a customer selecting a list of one or more items for purchase from a merchant. The input can indicate that the customer using the customer device will pick up the first items from a location of the merchant.

When the customer has arrived at the location of the merchant, the customer device can detect (1704) that the customer device is located in proximity with a merchant device operated by the merchant, e.g., by detecting a wireless signal from a signal source, e.g., a wireless access point or a BLE beacon, that is associated with the merchant device.

While the customer device is located in proximity with the merchant device, the customer device can receive (1706), from the merchant device or from a server coupled to the merchant device, a request to modify the list, including a request to add a new item to the list of selected items for purchase or a request to remove an item from the list.

The customer device can present (1708) an aggregated bill for display on the customer device. The aggregated bill can include a record of each item in the modified list. The aggregated bill can include a total price for items in the modified list.

Figure 18:
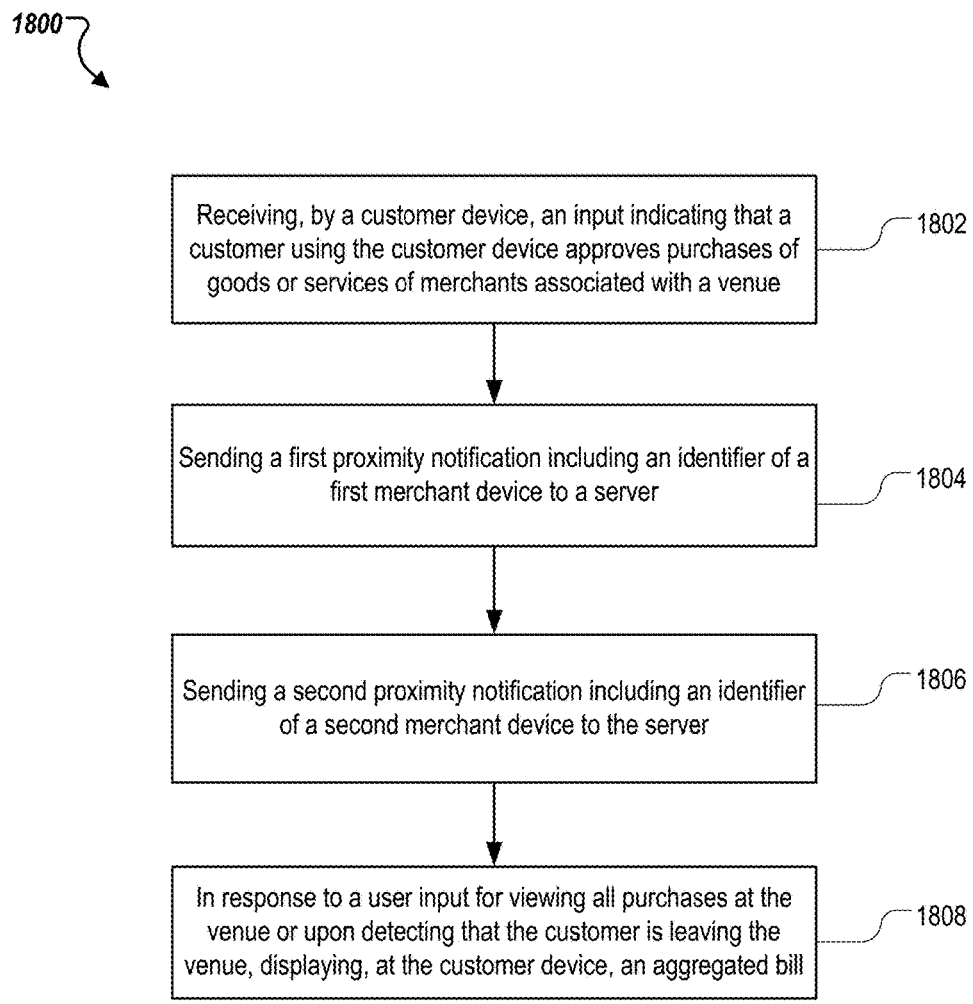
FIG. 18 is a flowchart of an example process of an open tab transactions at multiple locations performed by a customer device.

FIG. 18 is a flowchart of an example process 1800 of an open tab transactions at multiple locations performed by a customer device, e.g., customer device 102 of FIG. 2.

The customer device can receive (1802) an input from a customer using the customer device. The input can indicate that the customer approves purchases of goods or services from one or more merchants associated with a venue.

The customer device can detect that the customer device is located in proximity with a first merchant device operated by a first vendor located at the venue. In response, the customer device can send (1804) a first proximity notification including an identifier of the first merchant device to a server for processing.

The customer device can detect that the customer device is located in proximity with a second merchant device operated by a second vendor located at the venue. In response, the customer device can send (1806) a first proximity notification including an identifier of the second merchant device to a server for processing. The first vendor and second vender can be different kiosks of a same merchant. The first vendor and second vender can be different merchants. The first vendor can be located remotely from the second vendor.

The identifier of the first merchant device and the identifier of the second merchant device are associated with the venue in a merchant location database. The server aggregates a bill from the first vendor and a bill from the second vendor based on the identifier of the first merchant device and the identifier of the second merchant device to generate an aggregated bill.

In response to a user input for viewing all purchases at the venue, or upon detecting that the customer is leaving the venue, the customer device displays (1808) the aggregated bill. The aggregated bill lists items purchased from the first vendor and items purchased from the second vendor. The aggregated bill includes a total price of items purchased at the venue.

Figure 19:
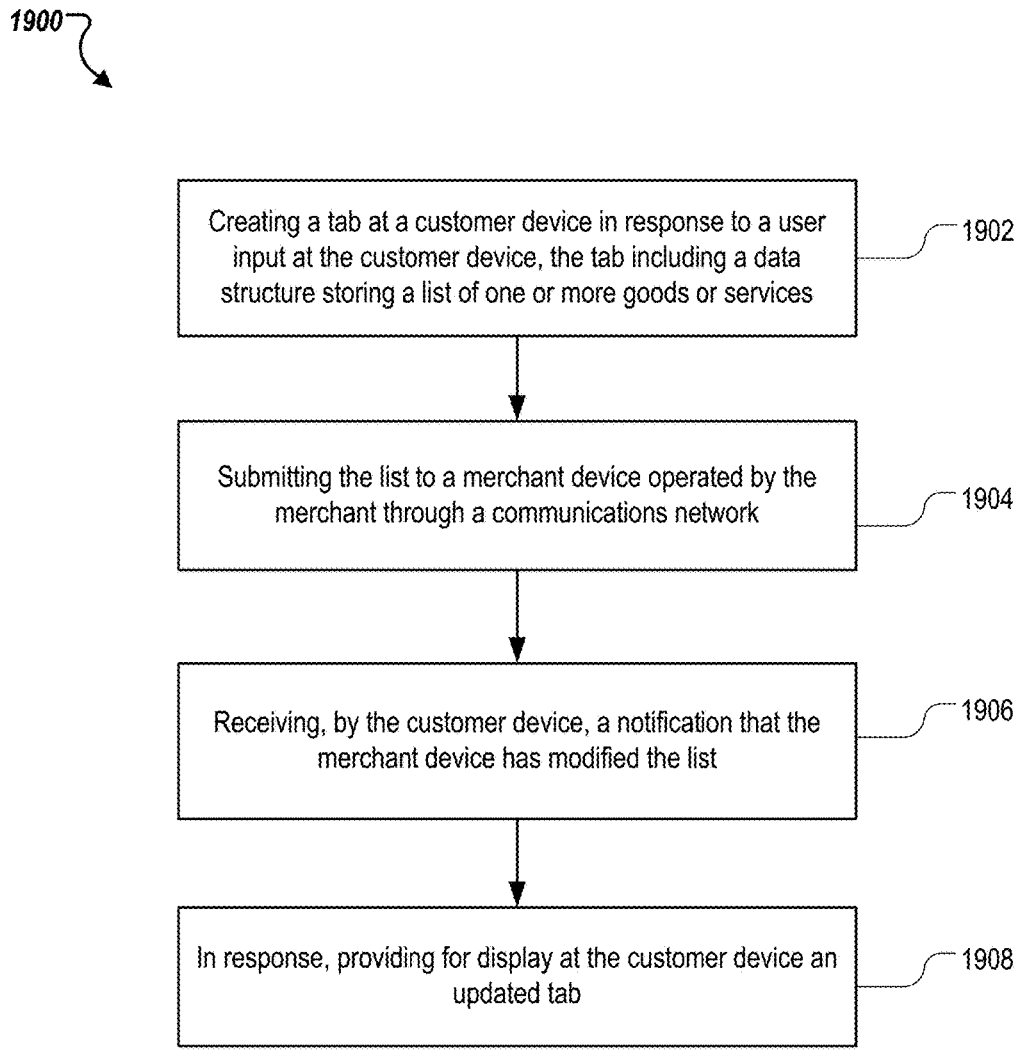
FIG. 19 is a flowchart of an example process of an open tab transaction.

FIG. 19 is a flowchart of an example process 1900 of an open tab transaction. Process 1900 can be performed by a customer device, e.g., customer device 102 of FIG. 2.

The customer device creates (1902) a tab in response to a user input at the customer device. The tab includes a data structure storing a list of one or more goods or services to purchase from a merchant. The list is associated with a payment amount for the goods or services. The customer device can include a smartphone.

The customer device submits (1904) the list to a merchant device operated by the merchant through a communications network. The merchant device can include a tablet or desktop computer.

The customer device receives (1906) a notification that the merchant device has modified the list, the modification being entered through a user interface displayed at the merchant device. Displaying the user interface at the merchant device is triggered by an alert indicating that the customer device is located in proximity with the merchant device.

In response, the customer device provides (1908) for display at the customer device an updated list, the updated tab including the modified list and a modified payment amount. The customer device can receive user input approving the modified list and the modified payment amount. In response, the customer device can close the tab, including preventing the merchant device from further modifying the order.

Figure 20:
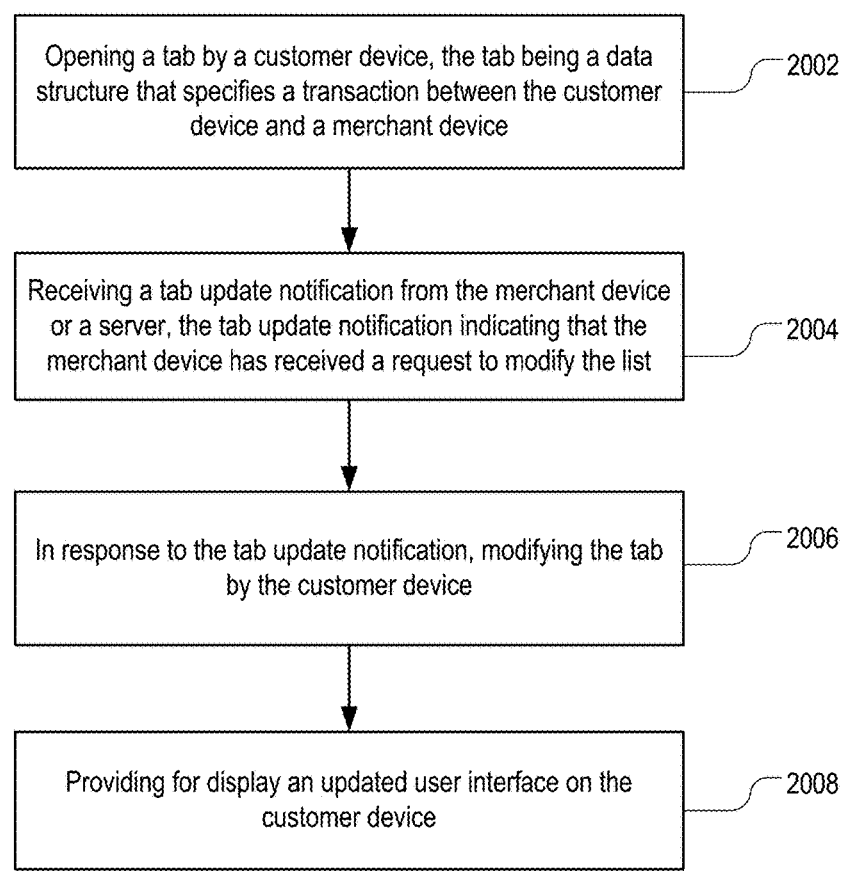
FIG. 20 is a flowchart of an example process of an open tab transaction.

FIG. 20 is a flowchart of an example process 2000 of an open tab transaction. Process 2000 can be performed by a customer device, e.g., customer device 102 of FIG. 2.

The customer device opens (2002) a tab. The tab can be a data structure that specifies a transaction between the customer device and a merchant device. The tab can include a list of one or more items a user selected for purchase from a merchant in the transaction. Opening the tab includes providing for display a user interface of the tab on the customer device. The tab can be created through a digital wallet program executing on the customer device. The digital wallet program is configured to associate the customer device with a payment card. Opening the tab occurs before the customer device reaches a proximity distance from the merchant device. The proximity distance corresponds to a detection range of a radio frequency (RF) signal from a signal source associated with the merchant device.

The customer device receives (2004) a tab update notification from the merchant device or a server. The tab update notification indicates that the merchant device has received a request from the user or from a merchant to modify the list. The request includes at least one of a request to add a new item to the list or a request to remove an already selected item from the list. The server includes one or more computers programmed to process transactions using information of the payment card, including submitting a total price of items in the list to a financial service for processing. Receiving the tab update notification occurs after customer device reaches the proximity distance from the merchant device.

In response to the tab update notification, the customer device modifies (2006) the tab, including at least one of adding the new item to the list or removing the already selected item from the list. In some implementations, the tab can be modified by the merchant device, or by the server.

The customer device provides (2008) for display an updated user interface on the customer device. The updated user interface represents the modified tab. Providing for display the updated user interface on the customer device can be triggered by a user request to review the tab or upon a notification of a departure of the customer device from the merchant device. Providing for display the updated user interface can include providing for display a user interface item for adding tips for each item in the list. The customer device can submit a transaction processing request to the server, which is programmed to process transactions of a payment card, upon receiving a user input through the updated user interface indicating that payment for each item in the list of the tab is approved by the user.

Figure 21:
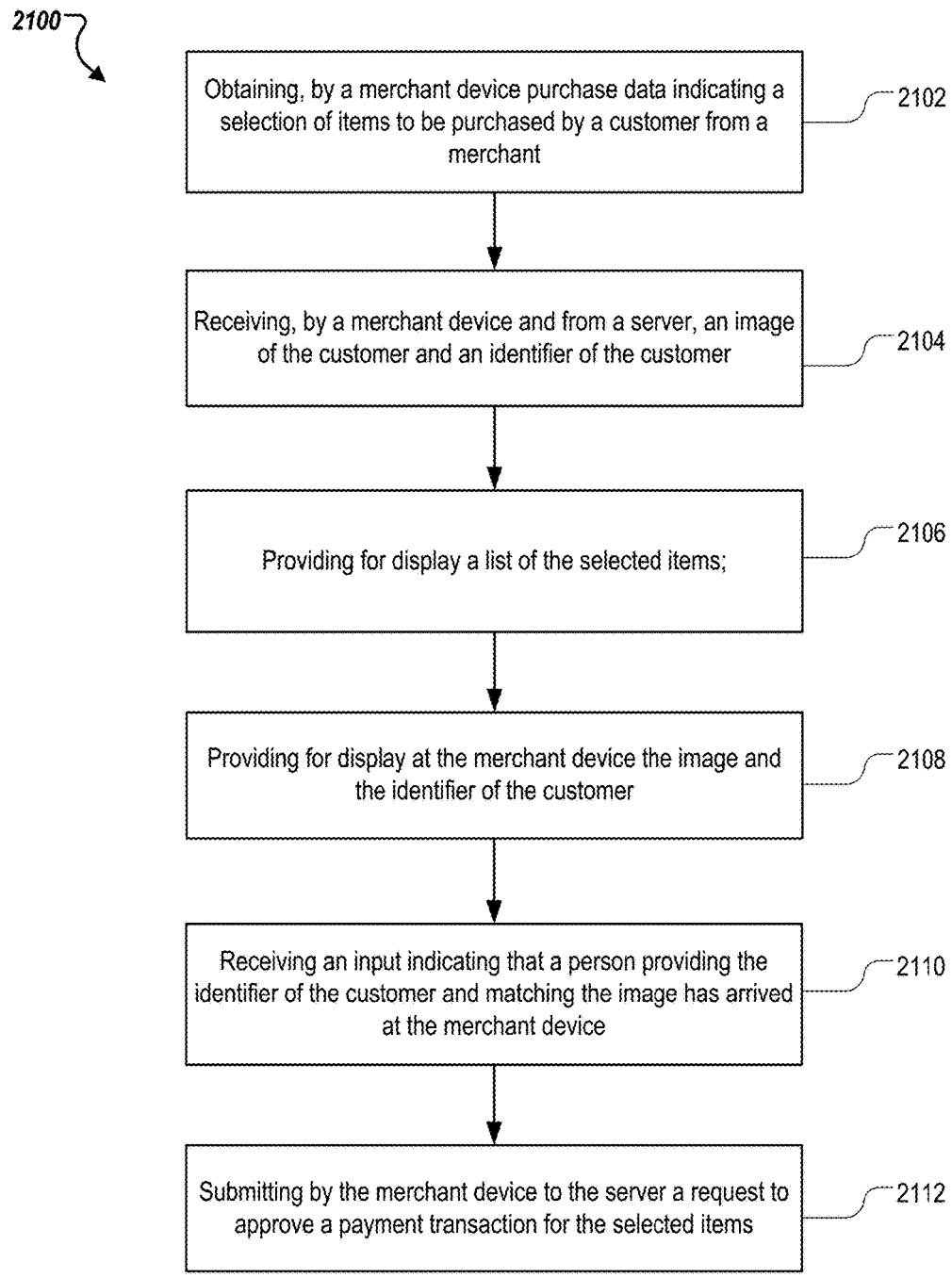
FIG. 21 is a flowchart of an example process of handling a pick up order by a merchant device.

FIG. 21 is a flowchart of an example process 2100 of handling a pick up order by a merchant device. The merchant device can obtain (2102) data purchase data indicating a selection of items to be purchased by a customer from a merchant operating the merchant device. The purchase data can indicate that the customer will come to a location of the merchant device to pick up the selected items. The merchant device can receive the purchase data from a server or from a merchant device network.

The merchant device can receive (2104), from a server, an image of the customer and an identifier of the customer. The merchant device can provide (2106) a list of the selected items.

The merchant device can provide (2108) for display at the merchant device the image and the identifier of the customer for verifying an identity of the customer.

The merchant device can receive (2110), from the merchant or an employee of the merchant operating the merchant device, an input indicating that a person providing the identifier of the customer and matching the image has arrived at the merchant device to pick up the items.

In response to the input, the merchant device submits (2112) to the server a request to approve a payment transaction for the selected items, including providing a total price of at least a portion of the selected items to the server for processing.

In some implementations, the merchant device can receive a second input for modifying the list of the items, including an input for adding an item from the list or removing an item from the list. The merchant device can modify the list according to the second input. In these implementations, providing the total price of at least a portion of the items to a financial service can include providing a total price of items in the modified list to the server.

Figure 22:
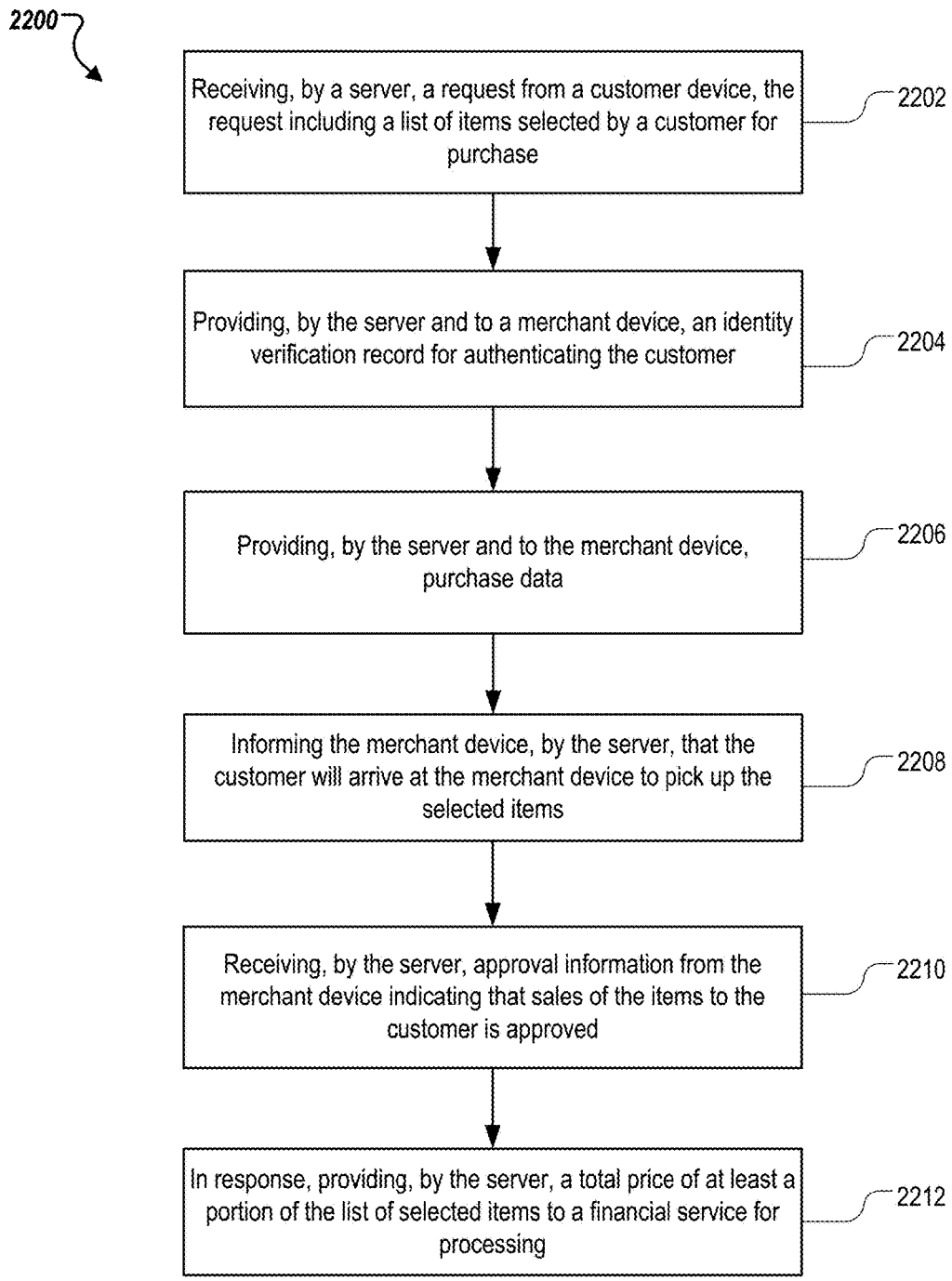
FIG. 22 is a flowchart of an example process of handling a pick up order by a server.

FIG. 22 is a flowchart of an example process 2200 of handling a pick up order by a server. The server can include one or more computer processors.

The server can receive (2202) a request from a customer device. The request includes a list of items selected by a customer for purchase from a merchant operating a merchant device.

The server provides (2204) an identity verification record for authenticating the customer to the merchant device. The merchant can use the identity verification record to authenticate the customer verbally, visually, or both. The identity verification record includes an identifier of the customer and at least one of: an explicit or encrypted pass phrase of the customer; an explicit or encrypted personal identification number; or an image of the customer.

The server provides (2206), to the merchant device, purchase data. The purchase data can include or reference the list of the selected items. The purchase data can include an estimated arrival time of the customer at the merchant device or a time the request was submitted to the server.

In some implementations, providing the purchase data and providing the identity verification record occur automatically without respect to a location of the customer or the customer device. In some implementations, providing the purchase data occurs automatically without respect to a location of the customer or the customer device. The server then receives a notification from the customer device indicating that the customer device is located in proximity with the merchant device. Providing the identity verification record is triggered by the notification.

In some implementations, in respond to the notification, the server submits to the merchant device an indication that the customer device is located in proximity with the merchant device. The server submits to the merchant device a request for the merchant device to update the group of one or more identity verification records.

In some implementations, the server receives a notification from the customer device indicating that the customer device is located in proximity with the merchant device, wherein providing the purchase data and providing the identity verification record are triggered by the notification.

The server informs (2208) the merchant device that the customer will arrive at the merchant device to pick up the selected items. The information can cause the merchant device to display the identity verification record in a group of one or more identity verification records of one or more respective customers who submitted requests to purchase items from the merchant. The group of one or more identity verification records can be a list that is ordered according to time associated with receipt of each request or ordered according to estimated arrival time associated with each request.

The server receives (2210) approval information from the merchant device indicating that sales of the items to the customer are approved by the merchant. In response, the server provides (2212) a total price of at least a portion of the list of selected items to a financial service for processing.

In some implementations, the merchant device can receive a second input for modifying the list of the items, including an input for adding an item from the list or removing an item from the list. The merchant device can modify the list according to the second input. In these implementations, providing the total price of at least a portion of the items to a financial service can include providing a total price of items in the modified list to the server.

Figure 23:
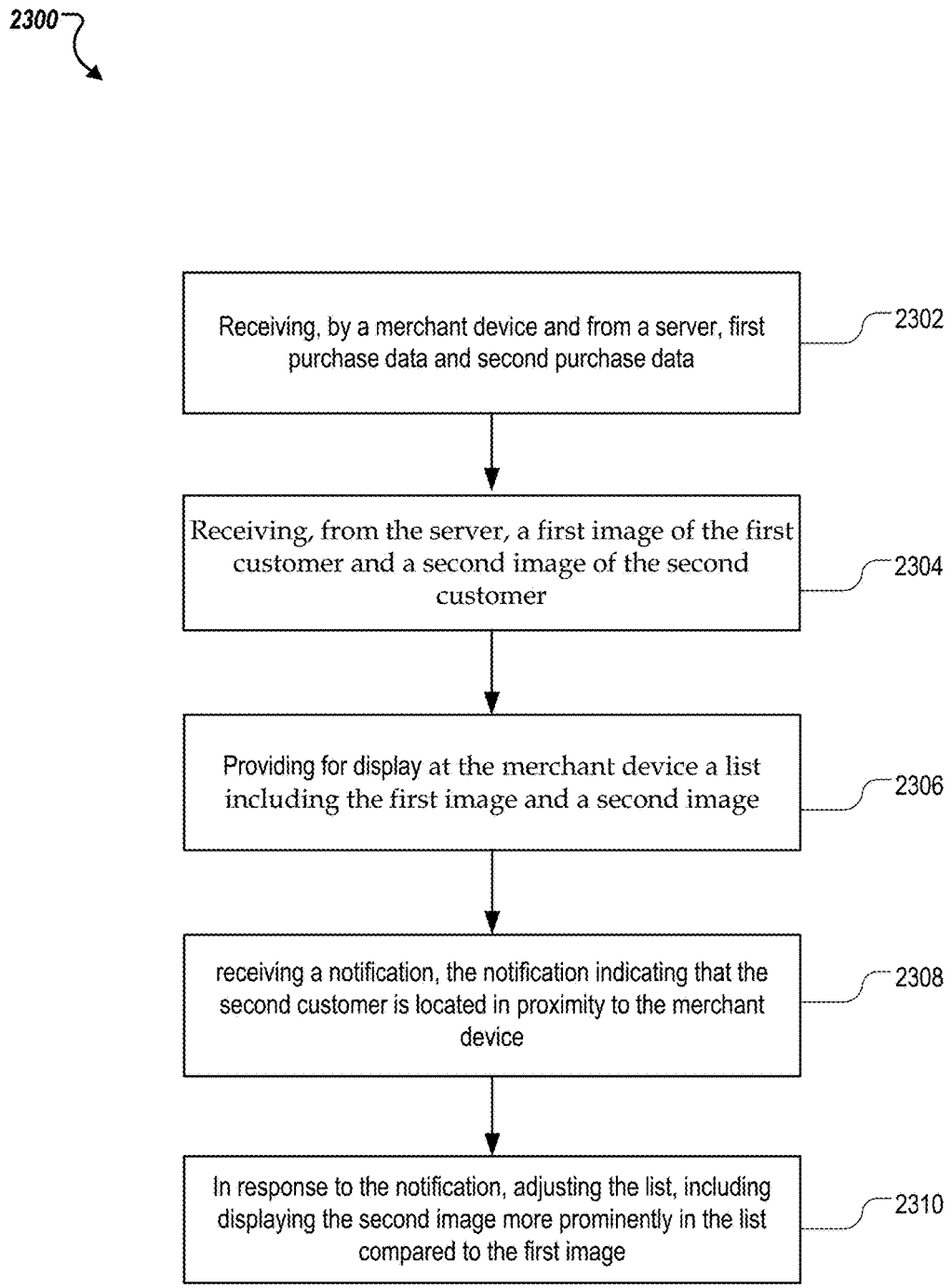
FIG. 23 is a flowchart of an example process of updating an identity verification record list by a merchant device.

FIG. 23 is a flowchart of an example process 2300 of updating an identity verification record list by a merchant device. The merchant device receives (2302), from a server, first purchase data and second purchase data indicating that a respective first customer and second customer will arrive at the merchant device to purchase items from a merchant operating the merchant device.

The merchant device receives (2304), from the server, a first image of the first customer and a second image of the second customer. The first image is associated with a higher priority than a priority of the second image. The priority can be determined based on order time. An earlier order time is associated with a higher priority. The order time can be a time the server receives a request from a customer device to purchase the items. The priority can be determined based on estimated arrival time of a customer at the merchant device. An earlier estimated arrival time corresponds to a higher priority. Each image can be a photograph of a respective customer.

The merchant device can provide (2306) for display a list including the first image and a second image. The first image and second image are ranked in the list according to their respective priority as provided by the server. Accordingly, the first image is displayed more prominently in the list compared to the second image.

The merchant device can receive (2308) from the server, from a customer device of the second customer, or from a proximity determination subsystem of the merchant device, a notification. The notification can indicate that the second customer is located in proximity to the merchant device, arriving at the merchant device earlier than an arrival time of the first customer.

In response to the notification, the merchant device adjusts (2310) the list, including displaying the second image more prominently in the list compared to the first image.

Figure 24:
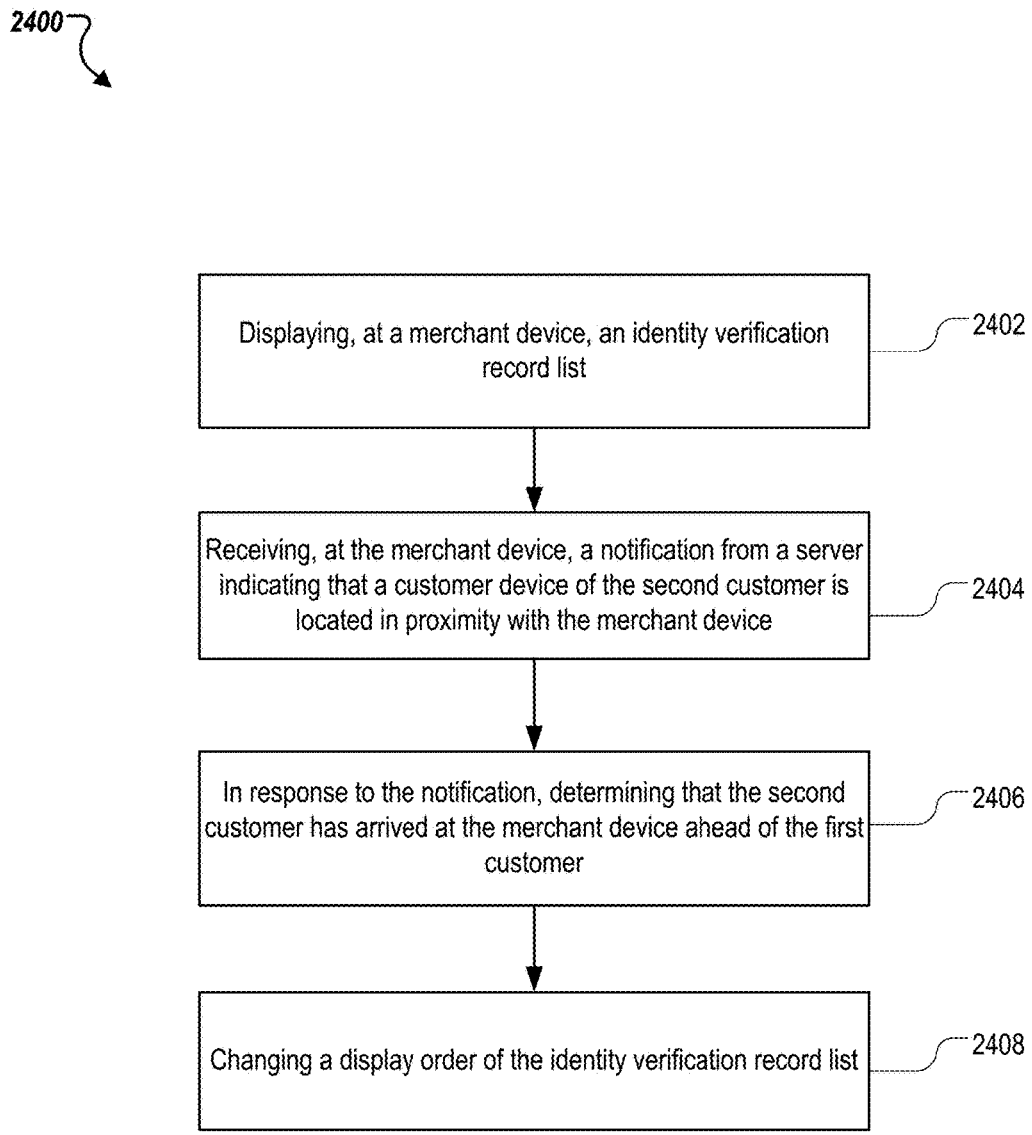
FIG. 24 is a flowchart of an example process of updating an identity verification record list by a merchant device.

FIG. 24 is a flowchart of an example process 2400 of updating an identity verification record list by a merchant device. The merchant device displays (2402) an identity verification record list. The identity verification record list includes a first identity verification record of a first customer and a second identity verification record of a second customer. Each identity verification record includes an identifier of a respective customer and at least one of: an explicit or encrypted pass phrase of the respective customer; an explicit or encrypted personal identification number of the respective customer; or an image of the respective customer.

The identity verification record list is ordered according to a respective priority of the first identity verification record and the second identity verification record. The priority of the first identity verification record is higher than a priority of the second identity verification record. Accordingly, the first identity verification record is displayed more prominently compared to the second identity verification record. The priority can be based on order time an earlier order time is associated with a higher priority. The order time can be time the server received a request from a customer device to purchase the items.

The merchant device receives (2404) a notification from a server indicating that a customer device of the second customer is located in proximity with the merchant device. The server provides the notification to the merchant device upon receiving a signal from the customer device indicating that the customer device detected a signal of a wireless signal source associated with the merchant device.

In response to the notification, the merchant device determines (2406) that the second customer has arrived at the merchant device ahead of the first customer. Determining that the second customer has arrived at the merchant device ahead of the first customer can include determining that the merchant device has not received a notification from the server indicating that a customer device of the first customer has detected a signal of a wireless signal source associated with the merchant device.

The merchant device then changes (2408) a display order of the identity verification record list, including displaying the second identity verification record more prominently compared to the first identity verification record.

Figure 25:
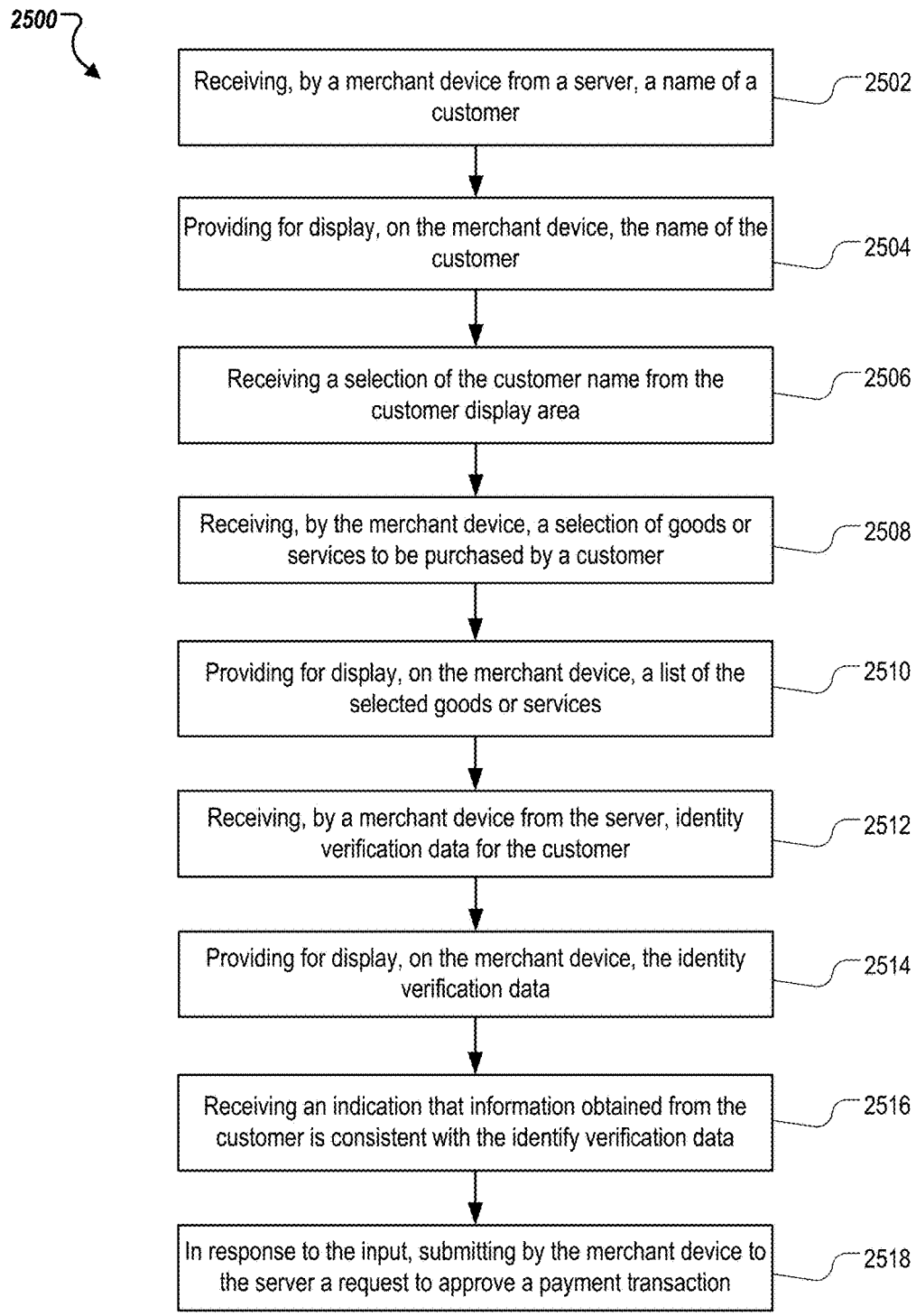
FIG. 25 is a flowchart of an example process of verifying an identity of a customer.

FIG. 25 is a flowchart of an example process 2500 of verifying an identity of a customer. Process 2500 can be performed by a merchant device.

The merchant device receives (2502), from a server, a name of a customer. The name of the customer is received prior to the customer being at the merchant device. The merchant device can provide for display, on the merchant device, a list of multiple customer names including the name of the customer. The list of the customer names can be ordered by time of receipt of the name of the customer from the server. The list of the customer names can be ordered by time of receipt of the selection of goods or services. Receiving the name of the customer occurs when a mobile device of the customer enters a geofence associated with the merchant device.

The merchant device provides (2504) the name of the customer for display. The merchant device displays the name in a customer display area on the merchant device prior to the customer being at the merchant device.

The merchant device receives (2506), by user input of a merchant, a selection of the customer name from the customer display area. The selection occurs, and is received, when the customer is at the merchant device.

The merchant device receives (2508) a selection of goods or services to be purchased by a customer from a merchant operating the merchant device with the customer to receive the selected goods or services at the location of the merchant device. The selection of goods or services can be received by user input into the merchant device. The selection of goods or services can be received by the merchant device from the server from customer input into a customer device. The selection of goods or services can be received together with the name of the customer from the server.

The merchant device provides (2510) for display a list of the selected goods or services.

The merchant device receives (2512), from the server, identity verification data for the customer. The identity verification data includes at least one of a pass phrase of the customer, a personal identification number of the customer, or an image of the customer.

The merchant device provides (2514) for display, on the merchant device, the identity verification data.

The merchant device receives (2516), from user input into the merchant device, an indication that information obtained from the customer is consistent with the identify verification data.

In response to the input, the merchant device submits (2518) to the server a request to approve a payment transaction for the selected goods or services.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for facilitating purchases from a merchant by a customer, comprising:

receiving, by a server and from one of a set of devices, a first purchase indication indicating a request by the customer to purchase a first item from the merchant, wherein the set of devices includes a customer device associated with the customer and a merchant device associated with the merchant;

generating a first purchase record at the server in response to receipt of the first purchase indication, the first purchase record identifying the customer's purchasing of the first item from the merchant;

creating a tab data structure at the server, the tab data structure storing at least the first purchase record;

receiving, by the server and from the merchant device associated with the merchant, a tab updating event alert indicating a request by the customer to purchase a second item from the merchant;

receiving, by the server and from the customer device, a proximity notification indicating that the customer device is within detection range of a short-range wireless signal output by a signal source associated with the merchant device after the tab data structure is created;

determining, at the server, that a payment for the first item and the second item is approved based on the proximity notification;

generating a second purchase record at the server in response to receipt of the tab updating event alert, the second purchase record identifying the customer's purchasing of the second item from the merchant;

updating the tab data structure at the server in response to receipt of the tab updating event alert, wherein updating the tab data structure includes adding the second purchase record to the tab data structure; and sending an aggregation of the first purchase record and the second purchase record from the server to a financial service server in response to updating the tab data structure and in response to determining that the payment for the first item and the second item is approved, thereby processing the payment for the first item and the second item.

2. The method of claim 1, wherein the proximity notification also indicates that a location of the customer device as determined via a Global Positioning System (GPS) receiver of the customer device is located in proximity with a location of the merchant device.

3. The method of claim 1, wherein the first purchase indication is received by the server from the customer device associated with the customer.

4. The method of claim 1, further comprising:
receiving, by the server and from the merchant device, an estimated time of readiness of the first item; and
providing the estimated time of readiness to the customer device.

5. The method of claim 1, further comprising:
determining, at the server, an estimated time of arrival of the customer at the merchant device using a distance between a location of the customer device and a location of the merchant device; and
providing the estimated time of arrival from the server to the merchant device.

6. The method of claim 1, wherein the tab updating event alert is based on an input received at the merchant device, the input selecting an information item including at least one of an identifier of the second item or a price of the second item, the information item to be included in the second purchase record.

7. The method of claim 1, wherein updating the tab data structure comprises:
receiving, by the server and from the merchant device, an updated tab data structure, wherein the second purchase record is added to the updated tab data structure by the merchant device; and
replacing, at the server, the tab data structure with the updated tab data structure.

8. The method of claim 1, wherein the first purchase record includes a price of the first item and the second purchase record includes a price of the second item, and wherein the aggregation of the first purchase record and the second purchase record includes a sum of the price of the first item and the price of the second item, and wherein sending the aggregation of the first purchase record and the second purchase record from the server to the financial service server comprises sending at least the sum to the financial service server.

9. The method of claim 1, comprising:
sending a unified bill from the server to the customer device, the unified bill identifying the first item and the second item, the unified bill also listing a sum of a price of the first item and a price of the second item.

10. A non-transitory storage device storing instructions that, when executed by one or more processors of a server, cause the one or more processors to perform operations for facilitating purchases from a merchant by a customer, the operations comprising:
receiving, by the server and from one of a set of devices, a first purchase indication indicating a request by the customer to purchase a first item from the merchant, wherein the set of devices includes a customer device associated with the customer and a merchant device associated with the merchant;
generating a first purchase record at the server in response to receipt of the first purchase indication, the first purchase record identifying the customer's purchasing of the first item from the merchant;
creating a tab data structure at the server, the tab data structure storing at least the first purchase record;
receiving, by the server and from the merchant device associated with the merchant, a tab updating event alert indicating a request by the customer to purchase a second item from the merchant;
receiving, by the server and from the customer device, a proximity notification indicating that the customer device is within detection range of a signal source associated with the merchant device after the tab data structure is created;
determining, at the server, that a payment for the first item and the second item is approved based on the proximity notification;
generating a second purchase record at the server in response to receipt of the tab updating event alert, the second purchase record identifying the customer's purchasing of the second item from the merchant;
updating the tab data structure at the server in response to receipt of the tab updating event alert, wherein updating the tab data structure includes adding the second purchase record to the tab data structure; and
sending an aggregation of the first purchase record and the second purchase record from the server to a financial service server in response to updating the tab data structure and in response to determining that the payment for the first item and the second item is allowed, thereby processing the payment for the first item and the second item.

11. The non-transitory storage device of claim 10, wherein the proximity notification also indicates that a location of the customer device as determined via a Global Positioning System (GPS) receiver of the customer device is located in proximity with a location of the merchant device.

12. The non-transitory storage device of claim 10, wherein the first purchase indication is received by the server from the customer device associated with the customer.

13. The non-transitory storage device of claim 10, the operations further comprising:
receiving, by the server and from the merchant device, an estimated time of readiness of the first item; and
providing the estimated time of readiness to the customer device.

14. The non-transitory storage device of claim 10, the operations further comprising:
determining, at the server, an estimated time of arrival of the customer at the merchant device using a distance between a location of the customer device and a location of the merchant device; and
providing the estimated time of arrival from the server to the merchant device.

15. The non-transitory storage device of claim 10, wherein the tab updating event alert is based on an input received at the merchant device, the input selecting an information item including at least one of an identifier of the second item or a price of the second item, the information item to be included in the second purchase record.

16. The non-transitory storage device of claim 10, wherein updating the tab data structure comprises:

receiving, by the server and from the merchant device, an updated tab data structure, wherein the second purchase record is added to the updated tab data structure by the merchant device; and replacing, at the server, the tab data structure with the updated tab data structure.

17. The non-transitory storage device of claim 10, wherein the first purchase record includes a price of the first item and the second purchase record includes a price of the second item, and wherein the aggregation of the first purchase record and the second purchase record includes a sum of the price of the first item and the price of the second item, and wherein sending the aggregation of the first purchase record and the second purchase record from the server to the financial service server comprises sending at least the sum to the financial service server.

18. The non-transitory storage device of claim 10, the operations further comprising:

sending a unified bill from the server to the customer device, the unified bill identifying the first item and the second item, the unified bill also listing a sum of a price of the first item and a price of the second item.

19. A system for facilitating purchases from a merchant by a customer, the system comprising:

a processor of a server; and a non-transitory storage device of the server storing instructions that, when executed by the processor of the server, cause the server to perform operations comprising:

receiving, by the server and from one of a set of devices, a first purchase indication indicating a, a request by the customer to purchase a first item from the merchant, wherein the set of devices includes a customer device associated with the customer and a merchant device associated with the merchant, generating a first purchase record at the server in response to receipt of the first purchase indication, the first purchase record identifying the customer's purchasing of the first item from the merchant, creating a tab data structure at the server, the tab data structure storing at least the first purchase record, receiving, by the server and from the merchant device associated with the merchant, a tab updating event alert indicating a request by the customer to purchase a second item from the merchant, receiving, by the server and from the customer device, a proximity notification indicating that the customer device is within detection range of a wireless signal output by a signal source associated with the merchant device after the tab data structure is created, determining, at the server, that a payment for the first item and the second item is approved based on the proximity notification, generating a second purchase record at the server in response to receipt of the tab updating event alert, the second purchase record identifying the customer's purchasing of the second item from the merchant, updating the tab data structure at the server in response to receipt of the tab updating event alert, wherein updating the tab data structure includes the second purchase record to the tab data structure, and sending an aggregation of the first purchase record and the second purchase record from the server to a financial service server in response to updating the tab data structure and in response to determining that the payment for the first item and the second item is approved, thereby processing the payment for the first item and the second item.

20. The system of claim 19, wherein the proximity notification also indicates that a location of the customer device as determined via a Global Positioning System (GPS) receiver of the customer device is located in proximity with a location of the merchant device.

21. The system of claim 19, wherein the first purchase indication is received by the server from the customer device associated with the customer.

22. The system of claim 19, the operations further comprising:

receiving, by the server and from the merchant device, an estimated time of readiness of the first item, and providing the estimated time of readiness to the customer device.

23. The system of claim 19, the operations further comprising:

determining, at the server, an estimated time of arrival of the customer at the merchant device using a distance between a location of the customer device and a location of the merchant device, and providing the estimated time of arrival from the server to the merchant device.

24. The system of claim 19, wherein the tab updating event alert is based on an input received at the merchant device, the input selecting an information item including at least one of an identifier of the second item or a price of the second item, the information item to be included in the second purchase record.

25. The system of claim 19, wherein updating the tab data structure comprises:

receiving, by the server and from the merchant device, an updated tab data structure, wherein the second purchase record is added to the updated tab data structure by the merchant device, and replacing, at the server, the tab data structure with the updated tab data structure.

26. The system of claim 19, wherein the first purchase record includes a price of the first item and the second purchase record includes a price of the second item, and wherein the aggregation of the first purchase record and the second purchase record includes a sum of the price of the first item and the price of the second item, and wherein sending the aggregation of the first purchase record and the second purchase record from the server to the financial service server comprises sending at least the sum to the financial service server.

27. The system of claim 19, the operations further comprising:

sending a unified bill from the server to the customer device, the unified bill identifying the first item and the second item, the unified bill also listing a sum of a price of the first item and a price of the second item.

* * * * *